US012108217B2

(12) United States Patent
Koehler

(10) Patent No.: US 12,108,217 B2
(45) Date of Patent: Oct. 1, 2024

(54) CROS UNIT FOR A CROS HEARING DEVICE SYSTEM

(71) Applicant: GN Hearing A/S, Ballerup (DK)

(72) Inventor: Erica D. Koehler, Westmont, IL (US)

(73) Assignee: GN Hearing A/S, Ballerup (DK)

( * ) Notice: Subject to any disclaimer, the term of this patent is extended or adjusted under 35 U.S.C. 154(b) by 71 days.

(21) Appl. No.: 17/726,495

(22) Filed: Apr. 21, 2022

(65) Prior Publication Data

US 2023/0345187 A1 Oct. 26, 2023

(51) Int. Cl.
*H04R 25/00* (2006.01)

(52) U.S. Cl.
CPC ........... *H04R 25/505* (2013.01); *H04R 25/43* (2013.01); *H04R 25/554* (2013.01); *H04R 25/556* (2013.01); *H04R 25/609* (2019.05)

(58) Field of Classification Search
CPC .... H04R 25/505; H04R 25/609; H04R 25/43; H04R 25/554; H04R 25/556
USPC .......................................................... 381/312
See application file for complete search history.

(56) References Cited

U.S. PATENT DOCUMENTS

| | | | | |
|---|---|---|---|---|
| 10,052,483 | B2 * | 8/2018 | Spahr | A61N 1/37252 |
| 10,715,933 | B1 * | 7/2020 | Ma | H04R 25/405 |
| 2021/0136501 | A1 * | 5/2021 | Ma | H04R 25/407 |

FOREIGN PATENT DOCUMENTS

| | | | | | |
|---|---|---|---|---|---|
| CH | 668 154 | A5 | 11/1988 | | |
| DE | 10 2008 030551 | | 8/2009 | | |
| DE | 10 2010 014213 | | 8/2011 | | |
| EP | 2 012 556 | A1 | 1/2009 | | |
| EP | 2 908 557 | A1 | 8/2015 | | |
| EP | 3 101 917 | A1 | 12/2016 | | |
| WO | WO-2014198323 | A1 * | 12/2014 | .......... | H04R 25/305 |

OTHER PUBLICATIONS

Extended European Search Report for EP Patent Appln. No. 22178904.3 dated Dec. 9, 2022.
Dillon Harvey Ed—Dillon Harvey: "Chapter sixteen: Cros, Bone-Conduction, and implanted hearings aids" , Jan. 1, 2001 (Jan. 1, 2001) , Hearing Aids, Sydney, Boomerang Press [U .A. ] AU, pp. 43.-450, XP002565888, ISBN: 978-1-58890-052-4.
English Abstract for Foreign Patent Appln. No. CH 668 154 A5.
English Abstract for Foreign Patent Appln. No. DE 10 2008 030551.
English Abstract for Foreign Patent Appln. No. DE 10 2010 014213.
English Abstract for Foreign Patent Appln. No. EP 2 012 556 A1.

* cited by examiner

*Primary Examiner* — Phylesha Dabney
(74) *Attorney, Agent, or Firm* — Vista IP Law Group, LLP

(57) ABSTRACT

The present invention relates to a contralateral routing of signal (CROS) unit for a contralateral routing of signal (CROS) hearing device system. The CROS unit is configured to detachably connect to a first behind-the-ear (BTE) unit. The CROS unit comprises a CROS identity label and a first electronic circuit. The first electronic circuit is configured to communicate the CROS identity label to the first BTE unit.

22 Claims, 9 Drawing Sheets

CROS UNIT FOR A CROS HEARING DEVICE SYSTEM

FIELD

Figure 1A:
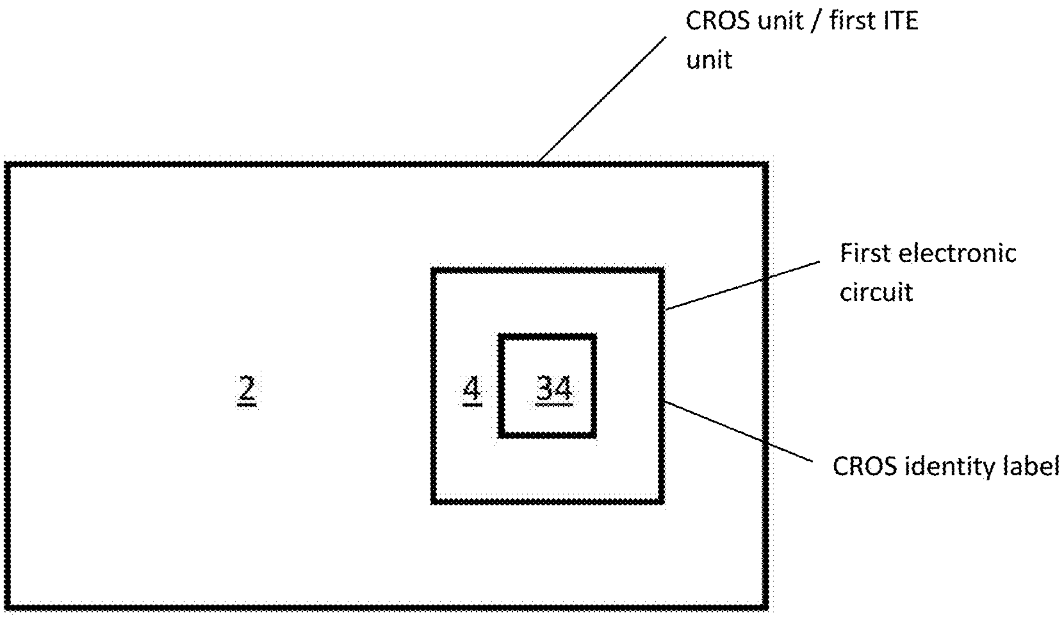

The present disclosure relates to a contralateral routing of signal (CROS) unit for a CROS hearing device system, to a hearing device comprising the CROS unit and to a method for initiating a fitting session of the CROS hearing device system.

BACKGROUND

Unilateral hearing loss, also known as single sided deafness, refers to a user with very little usable hearing or total loss of hearing in one, non-hearing ear with either normal hearing or aidable hearing loss in the other, hearing ear. There are limited amplification options for this type of hearing loss. One solution is to transmit sound, through a wired or a wireless connection, from side of the non-hearing ear, collected via one or more microphones, to the hearing ear, received by a receiver arranged on the hearing ear. An example of this is a CROS (Contralateral Routing of Signal) hearing device system. This type of hearing device system attempts to overcome the adverse consequences of the head shadow effect by providing awareness of sound from the side with little or no usable hearing that would otherwise be unavailable.

There are two variants of the CROS hearing device systems that use CROS technology. They are known as a CROS system and a Bilateral-CROS (BiCROS) system. The CROS system is designed for people with unilateral hearing loss, i.e. total or close to total hearing loss in one ear and normal hearing in the other ear. The BiCROS system is designed for people with bilateral hearing loss, i.e. total or close to total hearing loss on one ear and a hearing loss in the other ear compensable by a hearing device, such as a hearing aid. Typically, a CROS hearing device system comprises two individual devices, a CROS receiving device for the hearing ear and a CROS transmitting device for the non-hearing ear. The CROS transmitting device may comprise one or more microphones and the CROS receiving device may comprise a receiver, e.g. a miniature speaker. The CROS receiving device of a BiCROS system may be a hearing device, such as a hearing aid, that apply hearing loss compensation on the sounds that are sent there from the side with no hearing, as well as amplifying sounds collected at the hearing ear. Currently, a Hearing Care Professional (HCP) would need to have specific CROS devices of each type in stock, in case a user of the CROS hearing device system needs a replacement or repair. This is an expensive solution for the HCP, as users who need CROS hearing device systems make only 10% of all users needing assistance from the HCP. Alternatively, the HCP will not keep a stock of CROS devices but order them on demand. This may expose the users to a waiting time on new or repaired CROS device(s) and a period where the user goes without CROS devices.

The current programming and fitting of CROS hearing device systems requires that a HCP manually selects and match, via a fitting device or a fitting software, the CROS receiving device to be the hearing side and the CROS transmitting device to be the non-hearing side depending on the audiometry of the patient and further the HCP needs to manually enter configuration information and fitting parameters.

SUMMARY

It is an object of the present disclosure to mitigate, alleviate or eliminate one or more of the above-identified deficiencies and disadvantages in the prior art and solve at least the above-mentioned problem.

In particular, it is an object of the embodiments to provide a contralateral routing of signal (CROS) unit configured to connect to a standard behind-the-ear (BTE) unit of a hearing device.

It is yet a further object of the embodiments to provide a CROS unit being compatible with a standard BTE unit to thereby minimize or eliminate waiting time for a user in case one of the units needs to be replaced or repaired.

It is yet a further object of the embodiments to provide a hearing device system which would allow a Hearing Care Professional (HCP) to stock CROS units, i.e. in-the-ear (ITE) units being a cheaper part than BTE units or complete CROS devices, as a separate component of a hearing device and thereby minimize costs of the stock.

It is also an object of the embodiments to provide a CROS unit for a hearing device which would enable at least partly automatic initiation of a fitting session of a contralateral routing of signal (CROS) hearing device comprising the CROS unit.

It is also an object of the embodiments to provide a CROS unit which can automatically be detected by a behind-the-ear (BTE) unit.

It is a further object of the embodiments to provide a method for at least partly automatized initiation of a fitting session of a contralateral routing of signal (CROS) hearing device system.

According to a first aspect, a contralateral routing of signal (CROS) unit for a contralateral routing of signal (CROS) hearing device system is provided. The CROS unit is configured to detachably connect to a first behind-the-ear (BTE) unit. The CROS unit comprises a CROS identity label and a first electronic circuit. The first electronic circuit is configured to communicate the CROS identity label to the first BTE unit.

The CROS unit may be considered as an in-the-ear (ITE) unit, such as a first ITE unit, configured to be used for a deaf ear of the user. The CROS unit may be configured to be inserted partly or fully into the user's ear canal. The CROS unit typically does not deliver any output sound, i.e. acoustic output signal, into the user's ear and may also be referred as a dummy receiver. The CROS unit is configured to be arranged in the user's ear and to thereby hold and maintain the first BTE unit in place. The CROS unit may be configured to be used at either a left or a right ear. The CROS unit may look like a standard Receiver-in-Ear (RIE) unit and/or a Microphone-and-Receiver-in-Ear (MaRIE) unit and may be labeled so that a Hearing Care Professional (HCP) can distinguish it from a RIE and/or MaRIE unit for a hearing ear.

In the present context, the CROS hearing device system is to be understood as a system comprising two hearing devices, the first hearing device being configured to be worn on/at/in the deaf ear of the user and the second hearing device configured to be worn on/at/in the hearing ear. The first hearing device comprises the CROS unit and the first BTE unit and the second hearing device typically comprises a second in-the-ear (ITE) unit, such as a Receiver-in-Ear (RIE) unit or a Microphone-and-Receiver-in-Ear (MaRIE) unit, and a second BTE unit. The first and second BTE units may be identical, such as of the same type.

The CROS unit is configured to detachably connect to the first BTE unit. The CROS unit may comprise a first connector, such as a plug connector, configured to mate with a corresponding connector, such as a socket connector, arranged on/at/in the first BTE unit. The first connector may extend into a first electrical wire/tube connecting the first connector to a first earpiece of the CROS unit. The first connector of the CROS unit may be a standard connector configured to connect to any BTE unit configured to connect to a standard RIE unit and/or MaRIE unit. The first connector may be configured to provide mechanical and electrical connection between the CROS unit and the first BTE unit. Having a CROS unit configured to connect to any BTE unit allows for use of one type of BTE units in the CROS hearing device system, i.e. there is no need to stock CROS transmitting and receiving devices in, e.g. a hearing clinic, but only different types of ITE units, such as the CROS unit and RIE units and/or MaRIE units, are needed. This decreases the overall cost of the stock of the CROS hearing device system. In other words, the amount and a value of inventory needed at the HCP is decreased as separate units can be stored, i.e. standard BTE units and a cheaper CROS unit.

The first BTE unit is configured to be worn behind the ear of the user. The first BTE unit may comprise at least one first input transducer, a first power source and a first processing unit. The at least one first input transducer may comprise one or more first microphones for reception of input sound, i.e. acoustic signals, and conversion of the received input sound into corresponding primary first electric input signals. The first BTE unit and the CROS unit may be connected via a first electrical wire/tube. The first BTE unit may be of the same type as the second BTE unit used for the second hearing device. The first BTE unit may be any BTE unit suitable for being detachably attached to/with the CROS unit. Having the first BTE unit in the form of a BTE unit that may be used for a hearing ear, simplifies the CROS hearing device system as there is no need to store different BTE units for deaf and hearing ears.

In the present context, the CROS identity label comprised in the CROS unit is to be understood as information about the CROS unit that is to be communicated from the CROS unit to the first BTE unit. The CROS identity label may comprise information identifying the CROS unit as being a CROS unit and/or the first hearing device as being connected to a CROS unit and/or the first hearing device as being a CROS transmitting device. The CROS identity label may ensure automatic identification of the CROS unit. The CROS identity label may be a unique or non-unique identifier. The CROS identity label may be a simple binary information. For instance, the CROS identity label of the CROS unit may be 0 (zero) to specify that the CROS unit does not comprise a first receiver or that the first receiver is deactivated to be a non-working receiver. The CROS identity label may be part of first configuration information of the CROS unit. The first configuration information may comprise physical properties, electrical properties and/or electroacoustic properties of the CROS unit. The first configuration information may comprise information about a combination of components of the CROS unit, such as a length of the first electrical wire/tube connecting the CROS unit and the first BTE unit, information on if the CROS unit is configured for a left or right ear, information on whether the CROS unit is a CROS RIE unit or a CROS MaRIE unit, etc. The CROS identity label may define a CROS power level, such as zero power or no power, wherein the CROS power level is indicative of the CROS unit either not comprising a first receiver or the CROS unit comprising a deactivated and/or non-working first receiver.

The first electronic circuit comprised in the CROS unit may be a microcontroller or it may be a memory. The main purpose of the electronic circuit may be to comprise the CROS identity label and to ensure that the CROS identity label is communicated to the first BTE unit either on demand or as soon as the CROS unit is connected to the first BTE unit. The first electronic circuit may comprise its own battery, or it may be powered by the first BTE unit, once connected. The first electronic circuit may be comprised in either the first connector of the CROS unit or in the first earpiece of the CROS unit.

The first electronic circuit communicates the CROS identity label to the first BTE unit. The first electronic circuit may transmit the CROS identity label once the CROS unit is interconnected with the first BTE unit and/or upon a request from the first BTE unit. The CROS identity label may be transmitted through the first electrical wire/tube forming part of the CROS unit. If the CROS identity label is stored in the first memory of the first electronic circuit, the CROS identity label may be transmitted from the first memory via the first connector or via the first electrical wire/tube and the first connector to the first BTE unit. Alternatively, the first BTE unit is allowed access to read the CROS identity label upon connection to the first BTE unit or on demand from the first BTE unit. The first BTE unit may read the CROS identity label through the first connector and/or the first electrical wire/tube. The first BTE unit may store the CROS identity label and communicate it further to, e.g., a fitting software, on demand or upon establishing connection between the first BTE unit with the fitting software. Once the fitting software receives the CROS identity label, it may store the CROS identity label for further use.

It is advantageous to provide the CROS unit with a CROS identity label which can be communicated to the first BTE unit, as such CROS unit can be used with a standard BTE unit that can be used for either a deaf ear or a hearing ear of the user. Thus, there is no need to manufacture separate CROS transmitting and receiving devices, but only different types of ITE units, such as a CROS unit according to some embodiments and standard RIE and/or MaRIE units, and standard BTE units. This decreases the overall cost for the HCP's in terms of less stock of different ITE units and a better work flow. Furthermore, such CROS unit adds to the flexibility of the system as it is possible to combine different BTE units and ITE units. Also, repair situations of the CROS hearing device system are improved as it becomes more flexible, minimizes the risk that the user is left without hearing devices or require the HCP to stock more hearing devices of each type as with the current CROS systems. In particular, the repair situation has become more flexible because if a BTE unit of the CROS hearing device system stops working, the user can be provided with a loaner BTE unit while using the same CROS unit and if the CROS unit stops working, the user can be provided with a new CROS unit right away compatible with the user current BTE unit. Additionally, while using the CROS unit on one ear there is an opportunity for using this with different ITE units on the other ear, such as different RIE units and MaRIE units. It is also possible to replace other ITE units, such as different RIE units and MaRIE units, with a CROS unit. Additionally, the first BTE unit provided with the CROS unit is recognized by a fitting software as a CROS transmitting device that should not provide acoustic output signals to the user ear canal. Thus, the CROS unit allows the fitting software to identify the fitting session as a CROS type fitting session, select and/or assign the first hearing device as a CROS transmitting device, then based on that, select and/or assign the second hearing device configured to be arranged on the hearing ear as the CROS receiving device, and set up a graphical user interface (GUI) on a display of a fitting device or with access to the fitting software for a CROS fitting session. This limits the amount of time necessary for the HCPs to perform the full fitting and also reduces possible errors that may be made by the HCP when assigning the roles of the hearing devices as the CROS fitting session is set up automatically upon the fitting software receives or detect a CROS identity label, including assigning the roles of the first and second hearing device.

According to some embodiments, the CROS identity label is stored on the first electronic circuit. The first electronic circuit may be a microcontroller. The first electronic circuit may comprise a first memory. The CROS identity label may be programed and/or stored in the first memory of the first electronic circuit. In other words, the first memory may be configured for storing the CROS identity label. By storing the CROS identity label on the first electronic circuit the CROS unit is made identifiable by the BTE unit and the fitting software.

In some embodiments, the CROS identity label may be programed and/or hardcoded in the first electronic circuit. The CROS identity label may be programmed in production when the CROS unit is manufactured. After programing the first memory and/or the first electronic circuit with the CROS identity label, the first memory and/or the first electronic circuit and/or CROS identity label may be locked such that the CROS identity label cannot be changed later. By hardcoding the CROS identity label it is ensured that any future fitting of a first hearing device comprising the CROS unit will correspond to the hardware comprised in the CROS unit. Additionally, the hardcoded CROS identity label ensures correct identification of the CROS unit.

In some embodiments, the first electronic circuit comprises a first memory configured for storing the CROS identity label. The first memory may be a non-volatile memory, comprised in the microcontroller. Other first configuration information of the CROS unit may also be stored in the first memory. The first memory may be hardcoded with the CROS identity label and possibly other first configuration information which are fixed and related to the hardware of the CROS unit.

In some embodiments, the CROS unit comprises a first receiver configured to act as a non-working receiver. Such receiver may be a disabled or deactivated receiver. The non-working receiver is sometimes referred to as a disabled receiver, a deactivated receiver or a dummy receiver.

In some embodiments, the CROS unit comprises one or more connector pads and/or pins and/or terminals which connect the CROS unit to corresponding and/or matching connector pads, terminals and pins of the first BTE unit. The CROS unit may comprise one or more first sensors such as a temperature sensor and/or blood pressure sensor and/or fall detection sensor and/or snore detection sensor and/or movement detection sensor and/or acceleration sensor and/or a positioning sensor, such as a gyroscope, etc. The CROS unit may comprise a retention structure configured to position and/or retain the first hearing device on the user's ear and to keep it stable. As the first BTE unit may not comprise any attachment structure for keeping it in its position behind the ear of the user, the CROS unit, attached to the first BTE unit may serve as a retention structure.

According to a second aspect, a first hearing device comprising a first BTE unit and a CROS unit according to the first aspect is disclosed. The first hearing device comprises one or more first microphone(s), a first processing unit, a first antenna, and a first wireless communication unit. The one or more first microphone(s) are configured for reception of acoustic signals, such as surrounding sounds, and conversion of the received acoustic signals into corresponding first electrical input signals. The first wireless communication unit is configured for wireless communication. The wireless communication can be established with another hearing device, such as a second hearing device, and/or an electronic device, such as a personal device and/or a mobile phone, and/or a fitting device, etc.

In some embodiments, the first BTE unit may be configured to detect and/or receive and/or store the CROS identity label of the CROS unit. The first BTE unit may automatically detect and/or receive and/or store the CROS identity label of the CROS unit upon connection of the CROS unit to the first BTE unit. The first BTE unit may receive the CROS identity label upon a request transmitted form the first BTE unit to the CROS unit upon connection of the CROS unit to the first BTE unit. The first processing unit of the first BTE unit may be programed to transmit such request to the CROS unit. When the first BTE unit connects to the CROS unit, the CROS unit may automatically transmit the CROS identity label to the first BTE unit. Alternatively, the CROS identity label may be detected and/or received and/or stored by the first BTE unit on user's demand or during fitting of the first hearing device comprising the first BTE unit connected to the CROS unit. The CROS identity label may first be communicated and/or transmitted to the first BTE unit and possibly stored in the first processing unit of the first BTE unit. Later the first BTE unit may communicate and/or transmit the CROS identity label to a fitting software. The fitting software may then automatically know which type of fitting session to initiate. A CROS unit with a CROS identity label detectable and/or identifiable by the first BTE unit and the fitting software ensures faster, safer, and simplified initiation of a CROS fitting session of a CROS hearing device system by a HCP. Also, the HCP is relieved of the task of manually entering data relating to the type of fitting session and/or the role of the first and second hearing device during the initial setup of the fitting session.

In some embodiments, the first BTE unit is configured to adjust its operation in accordance with the CROS identity label. The CROS identity label identifies the CROS unit. The first BTE unit, upon access to or reception of the CROS identity label, may be configured, via a fitting software, to operate in accordance with the CROS unit which typically does not deliver any acoustic output signal to the ear of the user where it is worn. Thus, the first BTE unit may not perform any special processing of received acoustic signals with the aim of delivering the received acoustic signals to the ear of the user where it is worn. The first BTE unit may or may not perform processing schemes, such as noise reduction and/or beamforming, on the acoustic signal received at the first microphones with the aim of delivering the received acoustic signals to the other ear of the user where it is not worn. Thus, the first BTE unit may or may not perform processing schemes on the acoustic signal received at the first microphones before transmitting the acoustic signal and/or a representation of the acoustic signal to a CROS receiving device such as a second BTE device. Having the first BTE unit configured in accordance with the CROS identity label allows for use of a standard BTE unit, i.e. there is no need to have a dedicated BTE unit for a deaf ear, but rather the same type of BTE units can be used for both ears. This greatly simplifies the CROS hearing device system for users with unilateral hearing loss.

In some embodiments, the first hearing device is a CROS transmitting device. The first BTE unit may be configured to transmit an acoustic signal received at the user's first ear to a second hearing device provided at/on/in the user's second ear. In the present context, the CROS transmitting device is to be interpreted as a hearing device arranged on the user's deaf ear or on the ear with a non-compensable hearing loss. The second hearing device will then be arranged on the hearing ear or on the ear with better hearing, i.e. the ear with a compensable hearing loss. The first BTE unit, i.e. its one or more first microphone(s), receive sounds, i.e. acoustic signals, from the environment and/or from the user's speech, converts the received sounds into primary first electric input signals and transmits these signals to the second hearing device arranged on the hearing ear. The first and second hearing devices may be wirelessly connected and the primary first electric input signals may thereby be transmitted wirelessly. By transmitting the acoustic signals from the deaf ear to the hearing ear, the hearing of the CROS hearing device system user is improved as the user receives acoustic signals arriving at the deaf ear.

According to a third aspect, a set of hearing devices for a user comprising a first hearing device and a second hearing device is disclosed. The set of hearing devices of the third aspect may also be referred to as a CROS hearing device system. The first hearing device comprises a CROS unit according to the first aspect, the CROS unit is detachable connected to a first BTE unit. The first hearing device may be configured according to the second aspect. The first hearing device is a CROS transmitting device configured to be worn at a first ear of the user. The second hearing device is a CROS receiving device configured to be worn at a second ear of the user. The first ear, where the CROS transmitting device is arranged, is typically a deaf ear, while the second ear, where the CROS receiving device is arranged, is a normal hearing ear or an ear with hearing impairment. The first and second hearing devices may be wirelessly connected, and the first hearing device may transmit acoustic signals received at the first ear to the second hearing device. The CROS receiving device may function as a standard hearing device, such as a standard hearing aid, and additionally receive the primary first electrical signals from the first hearing device and provide them to the user as a secondary acoustic output signal, and thereby ensure that the acoustic signals received at the deaf ear are also perceived by the user. The secondary acoustic output signal may further comprise secondary first electrical signals provided by one or more second microphones of the second hearing device.

In an embodiment, the first and/or second hearing device is configured to be worn by a user. The first and/or second hearing device may be arranged at the user's ear, on the user's ear, over the user's ear, behind the user's ear and/or in the user's concha, i.e., the hearing device is configured to be worn in, on, over and/or at the user's ear. The user may wear two hearing devices, one hearing device at each ear. The two hearing devices may be connected, such as wirelessly connected and/or connected by wires, such as a binaural hearing aid system.

The first and/or second hearing device may be a hearable such as an earbud, a hearing aid, a personal sound amplification product (PSAP), an over-the-counter (OTC) hearing device, a hearing protection device, a one-size-fits-all hearing device, a custom hearing device or another head-wearable hearing device. Hearing devices can include both prescription devices and non-prescription devices.

The first and/or second hearing device may be embodied in various housing styles or form factors. Some of these form factors are Receiver-in-Canal (RIC) hearing device also known as a Receiver-in-Ear (RIE) hearing device, or Microphone-and-Receiver-in-Ear (MaRIE) hearing device. These devices may comprise a BTE unit, such as the first and/or second BTE unit, configured to be worn behind the ear of the user and an in the ear (ITE) unit, such as the first and/or second ITE unit, configured to be inserted partly or fully into the user's ear canal. Generally, the BTE unit may comprise at least one input transducer, such as the one or more first and/or second microphones, a power source, such as a first and/or a second power source, and a processing unit, such as the first and/or second processing unit. The term RIE, RIC and MaRIE hearing devices refer to hearing devices where the receiver may be comprised in the ITE unit, which is coupled to the BTE unit via a connector cable or electrical wire/tube, such as the first and/or second electrical wire/tube, configured for transferring electric signals between the BTE and ITE units.

Alternatively, the second hearing device may be embodied in other form factors, such as In-the-Ear (ITE) hearing device, Completely-in-Canal (CIC) hearing device or Invisible-in-Canal (IIC) hearing device. These hearing devices may comprise an ITE unit, wherein the ITE unit may comprise at least one input transducer, a power source, a processing unit and an output transducer. These form factors may be custom devices, meaning that the ITE unit may comprise a housing having a shell made from a hard material, such as a hard polymer or metal, or a soft material such as a rubber-like polymer, molded to have an outer shape conforming to the shape of the specific user's ear canal. Yet another form factor could be Behind the Ear (BTE) hearing devices, which refers to a hearing device where the receiver, i.e. the output transducer, is comprised in the BTE unit and sound is guided to the ITE unit via a sound tube connecting the BTE and ITE units, whereas the terms The person skilled in the art is well aware of different kinds of hearing devices and of different options for arranging the hearing device in, on, over and/or at the ear of the hearing device wearer. The hearing device (or pair of hearing devices) may be custom fitted, standard fitted, open fitted and/or occlusive fitted.

In an embodiment, the first and/or second hearing device may comprise one or more input transducers. The one or more input transducers may comprise one or more microphones, such as the one or more first and/or second microphones. The one or more input transducers may comprise one or more vibration sensors configured for detecting bone vibration. The one or more input transducer(s) may be configured for converting an acoustic signal into a first electric input signal, such as the primary and/or secondary first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the first and/or second hearing device may comprise one or more antenna(s), such as the first and/or the second antenna, configured for wireless communication. The one or more antenna(s) may comprise an electric antenna. The electric antenna may be configured for wireless communication at a first frequency. The first frequency may be above 800 MHz, preferably a wavelength between 900 MHz and 6 GHz. The first frequency may be 902 MHz to 928 MHz. The first frequency may be 2.4 to 2.5 GHz. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHz.

In an embodiment, the first and/or second hearing device may comprise one or more wireless communication unit(s), such as the first and/or second wireless communication unit. The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The hearing device may be configured for wired/wireless audio communication, e.g. enabling the user to listen to media, such as music or radio and/or enabling the user to perform phone calls.

In an embodiment, the wireless signal may originate from one or more external source(s) and/or external devices, such as spouse microphone device(s), wireless audio transmitter (s), smart computer(s) and/or distributed microphone array (s) associated with a wireless transmitter. The wireless input signal(s) may origin from another hearing device, e.g., as part of a binaural hearing system and/or from one or more accessory device(s), such as a smartphone and/or a smart watch.

In an embodiment, the first and/or second hearing device may include a processing unit, such as the first and/or second processing unit. The processing unit may be configured for processing the first and/or second electric input signal(s). The processing may comprise compensating for a hearing loss of the user, i.e., apply frequency dependent gain to input signals in accordance with the user's frequency dependent hearing impairment. The processing may comprise performing feedback cancelation, beamforming, tinnitus reduction/masking, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal, such as a primary and/or secondary first electric output signal, based on the processing of the first and/or second electric input signal(s). The processing unit may be configured to provide a second electric output signal, such as a primary and/or secondary second electric output signal. The second electric output signal may be based on the processing of the first and/or second electric input signal(s), such as the primary and/or secondary first electric input signal.

In an embodiment, the first and/or second hearing device may comprise an output transducer. The output transducer may be coupled to the processing unit. The output transducer may be a receiver, such as the first and/or second receiver. It is noted that in this context, a receiver may be a loudspeaker, whereas a wireless receiver may be a device configured for processing a wireless signal. The receiver may be configured for converting the first electric output signal, such as the primary or secondary first electric output signal, into an acoustic output signal, such as the first and/or second output signal. The output transducer may be coupled to the processing unit via the magnetic antenna. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In an embodiment, the wireless communication unit may be configured for converting the second electric output signal into a wireless output signal. The wireless output signal may comprise synchronization data. The wireless communication unit may be configured for transmitting the wireless output signal via at least one of the one or more antennas.

In an embodiment, the first and/or second hearing device may comprise a digital-to-analogue converter configured to convert the first electric output signal, the second electric output signal and/or the wireless output signal into an analogue signal.

In an embodiment, the first and/or second hearing device may comprise a vent. A vent is a physical passageway such as a canal or tube primarily placed to offer pressure equalization across a housing placed in the ear such as a RIE hearing device, a RIC hearing device, a MaRIE hearing device or a dome tip/earmold. The vent may be a pressure vent with a small cross section area, which is preferably acoustically sealed. The vent may be an acoustic vent configured for occlusion cancellation. The vent may be an active vent enabling opening or closing of the vent during use of the hearing device. The active vent may comprise a valve.

In an embodiment, the first and/or second hearing device may comprise a power source, such as a first and/or second power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

In an embodiment, the first and/or second hearing device may comprise a memory, such as the first and/or second memory, including volatile and/or non-volatile forms of memory.

According to a fourth aspect, a hearing device fitting system is configured for fitting the first hearing device according to the second aspect or the set of hearing devices according to the third aspect, wherein the hearing device fitting system comprises a fitting device executing a fitting software. The fitting device and the first hearing device are configured to establish a communication link for exchange of information. The first hearing device is configured to communicate the CROS identity label to the fitting software via the communication link.

The communication link may be wired, i.e. the first hearing device may be physically connected to the fitting device through a wire. Alternatively, the communication link may be wireless, i.e. the first hearing device may be wirelessly connected to the fitting device.

The established communication link serves for exchange of information between the first hearing device and the fitting device, i.e. the fitting software. The exchanged information may include the CROS identity label and/or first configuration information and/or first sensor information communicated from the first hearing device to the fitting software. The exchanged information may further include fitting parameters communicated from the fitting software to the first hearing device.

The hearing device fitting system may further be configured for fitting a second hearing device. The second hearing device may also communicate with the fitting device, i.e. the fitting software, through an established communication link. The fitting software may communicate fitting parameters to the second hearing device.

In some embodiments, the fitting device is a Hearing Care Professional (HCP) fitting device and the hearing device fitting system further comprises a personal device. The HCP fitting device may be the HCP's computer. The personal device may be used by the user using/wearing the first hearing device. The personal device may be the user's mobile phone, tablet, computer, etc. The personal device may be a part of the communication link between the first hearing device and the HCP fitting device. The personal device typically establishes a first local, e.g. Bluetooth, connection with the first hearing device. The personal device may also establish a second local, e.g. Bluetooth, connection with the second hearing device. The personal device may also establish a remote, e.g. Internet, connection with the HCP fitting device. The personal device may be configured to execute a software application (an app) for remote fitting of the first and/or second hearing device. The software application/app may facilitate remote fitting of the first and/or second hearing device.

The first hearing device may be configured to communicate the CROS identity label to the personal device and the personal device may be configured to communicate the CROS identity label to the fitting software. The personal device may be configured to communicate the CROS identity label to the fitting software via a server. The CROS identity label and/or first configuration information and/or first sensor information may be communicated to the software application from the first hearing device, in particular from the first BTE unit. Alternatively, the software application may request the CROS identity label and/or first configuration information and/or first sensor information from the first hearing device, or the software application may gain access to the CROS identity label and/or first configuration information and/or first sensor information through the first hearing device. The CROS identity label and/or first configuration information and/or first sensor information may be communicated to the software application from the first hearing device upon connection between the first hearing device and the personal device. Furthermore, the software application may set up a graphical user interface (GUI) on the personal device, such as on a display of the personal device, compatible with and/or supporting the functionality and/or remote fitting of a CROS hearing device system. Further functionality of the software application besides facilitating remote fitting may be allowing the user to stop transmission/streaming from the first hearing device to the second hearing device and/or balancing the input received at the one or more first and second microphones to be provided to the user by the second receiver in the second hearing device. The personal device and the first hearing device may be connected irrespective of the remote connection between the personal device and the HCP fitting device. Once the software application obtains the CROS identity label and/or first configuration information and/or first sensor information, the software application may further communicate the CROS identity label and/or first configuration information and/or first sensor information to the fitting software running on the HCP fitting device. The CROS identity label and/or first configuration information and/or first sensor information may be communicated to the fitting software from the personal device upon connection between the personal device and the HCP fitting device. This may be possible when connection is obtained through a virtual fitting room. Alternatively, the CROS identity label and/or first configuration information and/or first sensor information may be communicated/uploaded to and stored in a cloud database wherefrom the fitting software may retrieve/download the CROS identity label and/or first configuration information and/or first sensor information. Once the CROS identity label and optionally also the first configuration information is received at the fitting software, the fitting software will automatically assign the first hearing device as a transmitting device and the second hearing device as a receiving device. Furthermore, the fitting software may set up a graphical user interface (GUI) on the HCP fitting device, such as on a display of the HCP fitting device, compatible with and/or supporting remote fitting of a CROS hearing device system. The HCP may then adjust fitting parameters in the fitting software and the fitting software may then communicate these fitting parameters to the personal device. The fitting parameters may be communicated directly to the personal device through the virtual fitting room or to the cloud database wherefrom the software application may retrieve/download the fitting parameters. The personal device will then communicate the fitting parameters to the first hearing device and the second hearing device. Communicating the fitting parameters from the personal device to the first hearing device and/or the second hearing device may or may not require an accept from the user.

In some embodiments, the fitting software is configured to communicate the CROS identity label to the personal device. This may require that the first hearing device has communicated the CROS identity label and/or first configuration information to the fitting software in an earlier fitting session. As an example, the HCP may perform a pre fitting of the first hearing device without the presence of the user before delivering the first hearing device to the user. Once the software application obtains the CROS identity label and/or first configuration information, the software application may set up a graphical user interface (GUI) on the personal device, such as on a display of the personal device, compatible with and/or supporting the functionality and/or remote fitting of a CROS hearing device system. Both the first hearing device and the HCP fitting device may thus communicate the CROS identity label to the personal device. The software application may use the CROS identity label received from both the HCP fitting device and the first hearing device to check that a correct fitting is performed on the correct hearing device. Further functionality of the software application besides facilitating remote fitting may be allowing the user to stop transmission/streaming from the first hearing device to the second hearing device and/or balancing the input received at the one or more first and second microphones to be provided to the user by the second receiver in the second hearing device.

The above two embodiments are in particular advantageous for fitting sessions performed remotely, i.e. online. The remote/online fitting is normally performed in scenarios when the hearing device user is not present at the HCP, who normally operates the fitting software.

In some embodiments, the fitting device is a personal fitting device and the first hearing device is configured to communicate the CROS identity label to the personal fitting device. The personal fitting device may be used by the user using the first hearing device. The personal fitting device may be the user's mobile phone, tablet, computer, etc. The personal fitting device typically establishes a first local, e.g. Bluetooth, connection with the first hearing device. The personal fitting device may also establish a second local, e.g. Bluetooth, connection with the second hearing device. The personal fitting device may be configured to execute a software application (an app) for self-fitting of the first and/or second hearing device. The software application/app may perform self-fitting of the first and/or second hearing device.

The first hearing device may be configured to communicate the CROS identity label to the personal fitting device. The CROS identity label and/or first configuration information and/or first sensor information may be communicated to the software application from the first hearing device, in particular from the first BTE unit. Alternatively, the software application may request the CROS identity label and/or first configuration information and/or first sensor information from the first hearing device, or the software application may gain access to the CROS identity label and/or first configuration information and/or first sensor information through the first hearing device. The CROS identity label and/or first configuration information and/or first sensor information may be communicated to the software application from the first hearing device upon connection between the first hearing device and the personal fitting device. Furthermore, the software application may set up a graphical user interface (GUI) on the personal fitting device, such as on a display of the personal fitting device, compatible with and/or supporting the functionality and/or self-fitting of a CROS hearing device system. Further functionality of the software application besides facilitating remote fitting may be allowing the user to stop transmission/streaming from the first hearing device to the second hearing device and/or balancing the input received at the one or more first and second microphones to be provided to the user by the second receiver in the second hearing device. Once the CROS identity label and optionally also the first configuration information is received at the fitting software, the fitting software will automatically assign the first hearing device as a transmitting device and the second hearing device as a receiving device. The user may then adjust fitting parameters in the fitting software and the fitting software may then communicate these fitting parameters to the first and/or second hearing device. Communicating the fitting parameters from the personal fitting device to the first hearing device and/or the second hearing device may or may not require an accept from the user. This embodiment is in particular advantageous for self-fitting performed by the user, i.e. self-fitting of over-the-counter (OTC) hearing devices using a personal device of the user.

According to a fifth aspect, a method of initiating a fitting session of a hearing device fitting system is disclosed. The hearing device fitting system comprises a fitting software being executed by a fitting device. The first hearing device comprises a first BTE unit and a CROS unit configured to detachably connect to the first BTE unit. The method comprises:

- interconnecting the CROS unit to the first BTE unit;
- communicating, from the CROS unit, a CROS identity label to the first BTE unit;
- establishing a connection between the first hearing device and the fitting software,
- wherein the fitting software receives the CROS identity label from the first BTE unit, i.e. by communicating the CROS identity label from the first BTE unit to the fitting software.

In the present context, fitting of a hearing device is to be interpreted as adjusting various settings of the hearing device to fit the hearing condition and/or preferences of the hearing device user. Generally, hearing aids need to be properly fitted to user's ears so that they provide the correct amount of, e.g., amplification in terms of gain and compression to maximize hearing aid benefits.

The CROS unit is typically manually interconnected to the first BTE unit. Once the two units are interconnected, the CROS unit may automatically communicate the CROS identity label to the first BTE unit, then the CROS unit may automatically be recognized by the first BTE unit and further by the fitting software, upon establishment of the connection of the first hearing device with the fitting software. Communication of the CROS identity label may include transmitting and receiving the CROS identity label. The CROS identity label may be provided by the CROS unit to the first BTE unit. Alternatively, communication of the CROS identity label may include giving and obtaining access to read the CROS identity label. The first BTE unit may access the CROS identity label stored at the CROS unit. The connection between the first hearing device and the fitting software may be established wirelessly, by establishing a wireless connection between the first hearing device and the fitting device. Alternatively, the first hearing device, i.e. the first BTE unit, may have a physical, such as wired, connection with the fitting device. As the first BTE unit has the CROS identity label communicated from the CROS unit, the CROS identity label may also be stored at the first BTE unit. After that, the CROS identity label may automatically be communicated to the fitting software. The fitting software, upon receiving the CROS identity label may identify the applicable hearing device fitting session as a CROS type fitting session. Once the fitting software receives the CROS identity label, the fitting software may store the CROS identity label for further use.

In some embodiments, the fitting device is a Hearing Care Professional (HCP) fitting device and the hearing device fitting system further comprises a personal device. The personal device may be used by the user using the first hearing device. The personal device may be the user's mobile phone, tablet, computer, etc. The step of establishing a connection between the first hearing device and the fitting software may include:

- establishing a first local connection between the first hearing device and the personal device, and
- establishing a remote connection between the personal device and the HCP fitting device.

The fitting software may receive the CROS identity label from the first BTE unit via the personal device and/or the personal device may receive the CROS identity label from the fitting software. The first hearing device may receive, via the remote connection, fitting parameters from the HCP fitting device, i.e. the fitting software.

Establishing a first local connection between the first hearing device and the personal device is typically establishing a Bluetooth connection. The personal device may also establish a second local, e.g. Bluetooth, connection with the second hearing device.

Establishing a remote connection between the personal device and the HCP fitting device is typically establishing Internet connection between the two devices. The personal device may be configured to execute a software application (an app) for remote fitting of the first and/or second hearing device. The software application/app may facilitate remote fitting of the first and/or second hearing device.

In this embodiment, the CROS identity label and/or first configuration information and/or first sensor information may be communicated from the first hearing device to the personal device, i.e. the software application/app, and then the CROS identity label and/or first configuration information and/or first sensor information may be communicated from the personal device, i.e. the software application/app, to the HCP fitting device, i.e. the fitting software. Alternatively or additionally, the CROS identity label may be communicated from the fitting software to the personal device, i.e. the software application/app. The CROS identity label and/or first configuration information and/or first sensor information may be communicated to the software application from the first hearing device, in particular from the first BTE unit via the first local connection. Alternatively, the software application may request, also through the first local connection, the CROS identity label and/or first configuration information and/or first sensor information from the first hearing device, or the software application may gain access to the CROS identity label and/or first configuration information and/or first sensor information through the first hearing device. The personal device and the first hearing device may be locally connected irrespective of the remote connection between the personal device and the HCP fitting device. Once the software application obtains the CROS identity label and/or first configuration information and/or first sensor information, the software application may further communicate, via the remote/Internet connection, the CROS identity label and/or first configuration information and/or first sensor information to the fitting software running on the HCP fitting device. Once the CROS identity label and optionally also the first configuration information is received at the fitting software, the fitting software will automatically assign the first hearing device as a transmitting device and the second hearing device as a receiving device. The HCP may then adjust fitting parameters in the fitting software and the fitting software may then communicate, via the remote/Internet connection, these fitting parameters to the personal device. The personal device will then communicate the fitting parameters to the first hearing device and the second hearing device via the first and second local, e.g. Bluetooth, connections. Connecting the first and/or second hearing device with the software application on the personal device and/or communication of the CROS identity label from the fitting software to the personal device may require that the first and/or second hearing device has been connected with the fitting software in an earlier fitting session. As an example, the HCP may have performed a pre fitting of the first and/or second hearing device without the presence of the user before delivering the first and/or second hearing device to the user. This embodiment is in particular advantageous for fitting sessions performed remotely, i.e. online. The remote/online fitting is normally performed in scenarios when the hearing device user is not present at the HCP, who normally operates the fitting software.

In some embodiments, the fitting device is a personal fitting device or a HCP fitting device and establishing a connection between the first hearing device and the fitting software includes:

establishing a first local connection between the first hearing device and respectively the personal fitting device or HCP fitting device, wherein the fitting software receives the CROS identity label from the first BTE unit.

Establishing a first local connection between the first hearing device and respectively the personal fitting device or the HCP fitting device is typically establishing a Bluetooth connection. The personal fitting device or HCP fitting device may also establish a second local, e.g. Bluetooth, connection with the second hearing device.

In case the fitting device is a personal fitting device, this embodiment is in particular advantageous for self-fitting performed by the user, i.e. self-fitting of over-the-counter (OTC) hearing devices using a personal fitting device of the user.

In case the fitting device is a HCP fitting device, this embodiment is in particular advantageous for conventional and/or professional fitting where the user is present at the HCP.

In some embodiments, the fitting software is automatically assigning the first hearing device as a CROS transmitting device. Typically, the user needs hearing devices on both ears, a CROS transmitting device and a CROS receiving device. At first, ITE units may be connected to respective BTE units, wherein one of the ITE units, such as the first ITE unit, is the CROS unit and the other ITE unit may be a standard ITE unit, such as a RIE or MaRIE unit. The hearing devices, or in particular at least one BTE unit, may be detected by the fitting software. The hearing device, or in particular at least one BTE unit may be connected to the personal device and thereby detected by the fitting software via the personal device, and in particular through the software application/app executed on the personal device. The fitting software, having detected, read or received the CROS identity label of the at least one CROS unit may automatically assign the first hearing device as the CROS transmitting device and the second hearing device arranged on the hearing ear as the CROS receiving device. In particular, the fitting software may identify the sides (left/right) where the hearing devices are worn, power level of the receiver in the CROS receiving device, lengths of the electrical wire/tubes connecting the BTE and ITE units, etc. The two hearing devices may also be paired together by/via the fitting software. This is usually the case when permanent changes are made to the hearing devices. The fitting software may also apply the appropriate settings and enable the appropriate options for both the first and second hearing devices within the fitting software. The fitting software may set up a graphical user interface (GUI) for the CROS fitting. The fitting software may save the new settings directly into the hearing devices, i.e. the respective BTE units, such as in a processing unit of the respective BTE units. Additionally, changes may be made using a remote fitting, i.e. via the personal device and the software application executed on the personal device. At the remote fitting the fitting software may transmit the new settings/fitting parameters to the software application/app on an electronic device, such as a personal device and/or a mobile phone, which will then apply/transmit the settings/fitting parameters to the hearing devices.

In some embodiments, the fitting device may automatically initiate a CROS fitting session upon detection, reading or receipt of the CROS identity label. After the HCP opens/starts the fitting software and initiates detection of hearing devices within a predefine proximity of the fitting software, the automatic initiation of the CROS fitting session comprising set up of a graphical user interface (GUI) upon detection, reading or receipt of the CROS identity label. Based on the received CROS identity label, the fitting device, i.e. the fitting software, may assign the roles of the two hearing devices, i.e. the fitting software may be assigned which hearing device is the transmitting device and which is the receiving device. Then the HCP may perform further steps in fitting of the hearing devices. It is advantageous to have an automatic initiation of the fitting session as it saves time for a HCP and prevents any mistakes that may be made during the initiation of the fitting session.

In some embodiments, the fitting device comprises a display and/or the fitting software comprises a graphical user interface (GUI). A representation of the CROS identity label may be outputted on the display and/or graphical user interface. The fitting software may be configured to control the display of the fitting device. In some embodiments, the CROS identity label may be a binary information. In that case, the fitting software may have predetermined settings interfaced with the particular binary information and these settings may be the representation of the CROS identity label which may be outputted on the display and/or graphical user interface. Alternatively, the CROS identity label may define a CROS power level, such as zero power or no power. The HCP may further adjust the settings of the hearing devices via the graphical user interface of the fitting software outputted on the display.

In some embodiments, the representation of the CROS identity label may be outputted on the display and/or graphical user interface (GUI) together with further first configuration information of the first hearing device. The further first configuration information may be manipulated by the HCP performing the fitting of the hearing device.

In some embodiments, the CROS hearing device system further comprises a second hearing device. The method may further comprise establishing a connection between the second hearing device and the fitting software. The connection between the second hearing device and the fitting software may be established via the personal device and the software application executed thereon. The fitting software may automatically assign the second hearing device as a CROS receiving device. After that, the fitting software may facilitate pairing of the first and second hearing device. Having the method which further facilitates automatic identification/detection and selection of the second hearing device. Such method saves time and prevents mistakes that may happen if a HCP is doing the selection manually.

In some embodiments, the fitting device comprises a processor configured for mapping the CROS identity label received from the first hearing device. Depending on the form of the CROS identity label, the processor may have different mapping for different forms of the CROS identity label. For instance, if the CROS identity label is a binary information, e.g. "0" (zero), the processor may map it to, e.g., CROS transmitting device.

In some embodiments, the first hearing device used in the method according to the fifth aspect is a hearing device according to the second aspect and/or the hearing device fitting system used in the method according in the fifth aspect is a hearing device fitting system according to the fourth aspect.

Effects and features of the second, third, fourth, and fifth aspects are to a large extent analogous to those described above in connection with the first aspect. Embodiments mentioned in relation to the first aspect are largely compatible with the second, third, fourth, and fifth aspects.

The present disclosure relates to different aspects including the CROS unit for a CROS hearing device system, a first hearing device, a set of hearing devices, a hearing device fitting system and the method for initiating a fitting session of the hearing device fitting system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

All four aspects provide a CROS unit for a CROS hearing device system which supports a reduction in errors when matching a first hearing device comprising the CROS unit and a first BTE unit to be the transmitting device in a fitting session using a fitting software, and a more intuitive and automatic initiation of the fitting session.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", and "the" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Throughout the present disclosure the terms "first", "second", "primary", "secondary", etc. are used here and elsewhere for labelling purposes only and are not intended to denote any specific spatial or temporal ordering, but are included to identify individual elements. Throughout the present disclosure the terms "first", "second", "primary", "secondary", etc. does not necessarily indicate any timing and/or prioritizing of the respective events or steps. Accordingly, one event, such as a first event, may occur before, during, or after another event, such as a second event, or the one event may occur at any combination of before, during, and after the other event.

BRIEF DESCRIPTIONS OF THE DRAWINGS

The above objects, as well as additional objects, features and advantages of the present disclosure, will become readily apparent to those skilled in the art by the following illustrative and non-limiting detailed description of example embodiments of the present disclosure, when taken in conjunction with the accompanying drawings.

FIG. 1 a schematically illustrates an exemplary embodiment of a CROS unit according to an embodiment of the present disclosure.

Figure 1B:
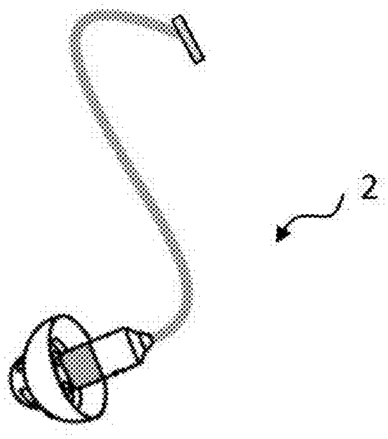

FIG. 1*b* schematically illustrates an exemplary embodiment of the CROS unit in FIG. 1*a*.

Figure 2A:
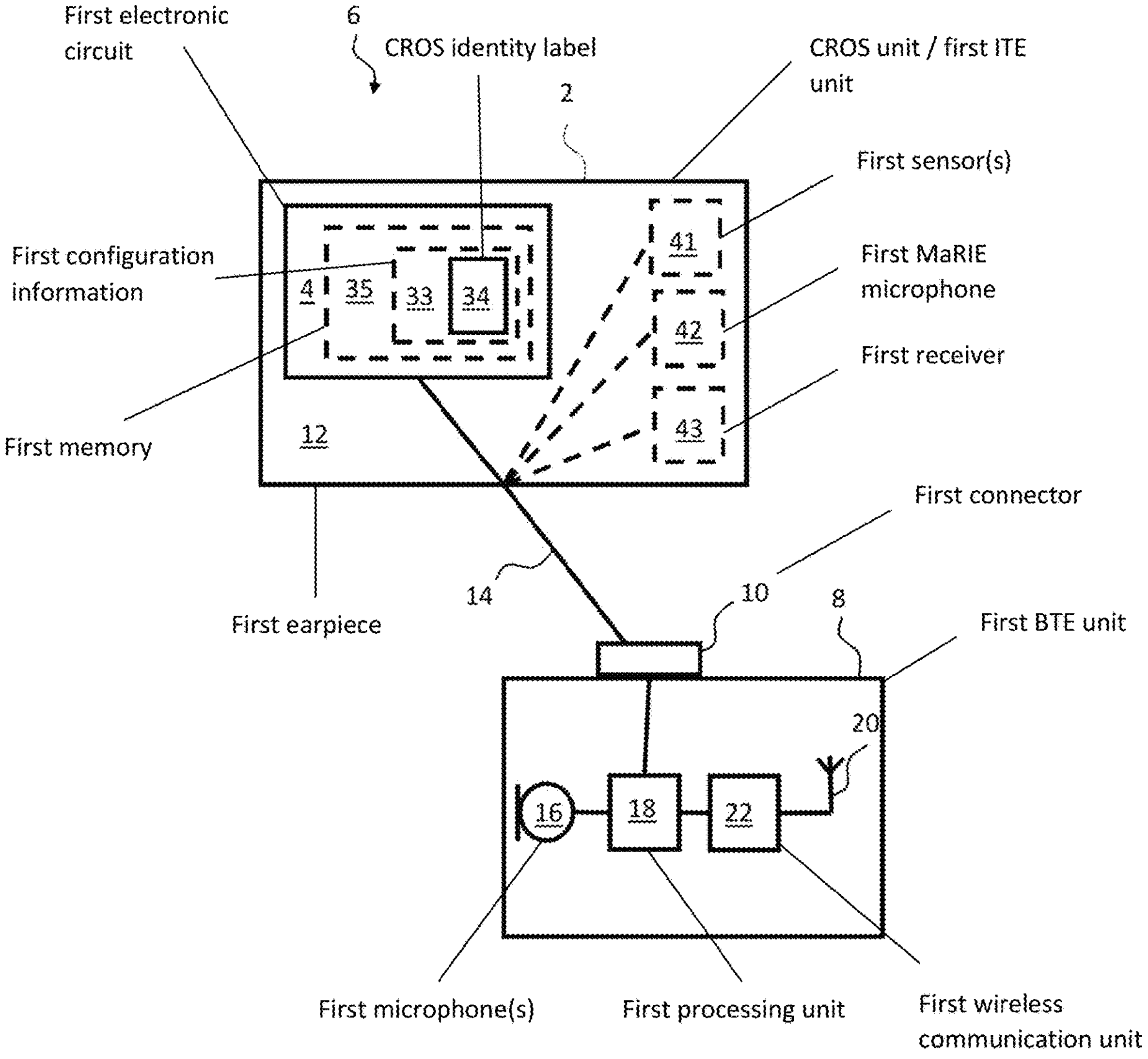

FIG. 2*a* schematically illustrates an exemplary embodiment of a CROS hearing device, i.e. the first hearing device, according to an embodiment of the present disclosure.

Figure 2B:
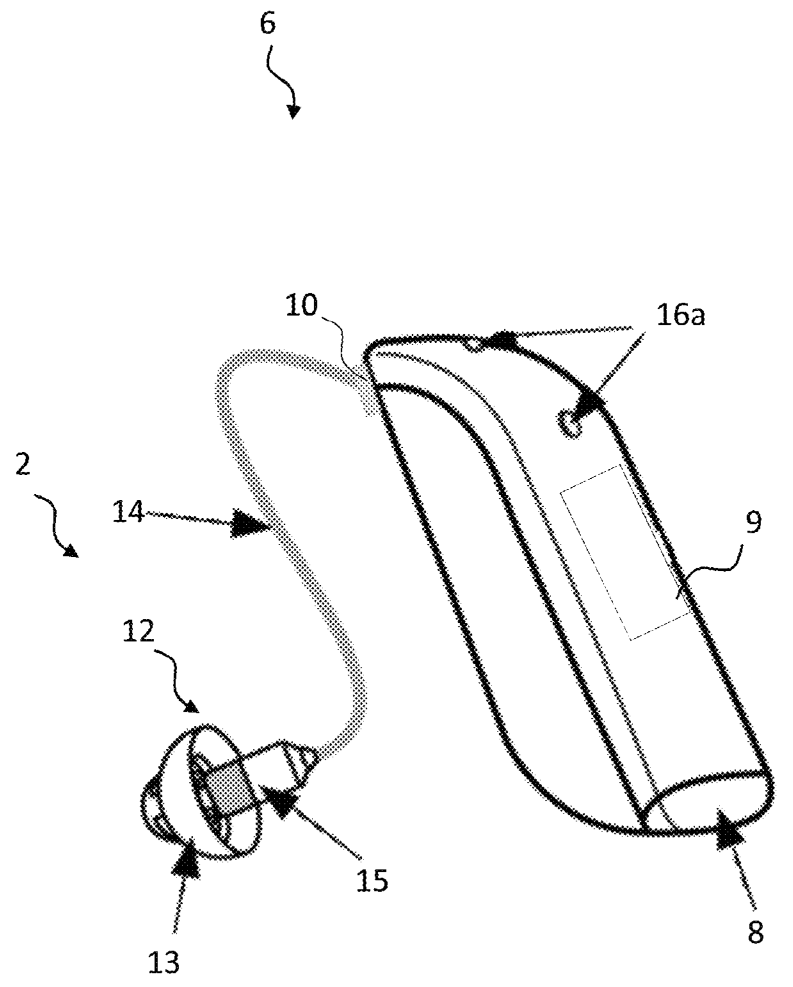

FIG. 2*b* schematically illustrates an exemplary embodiment of the CROS hearing device in FIG. 2*a*.

Figure 3:
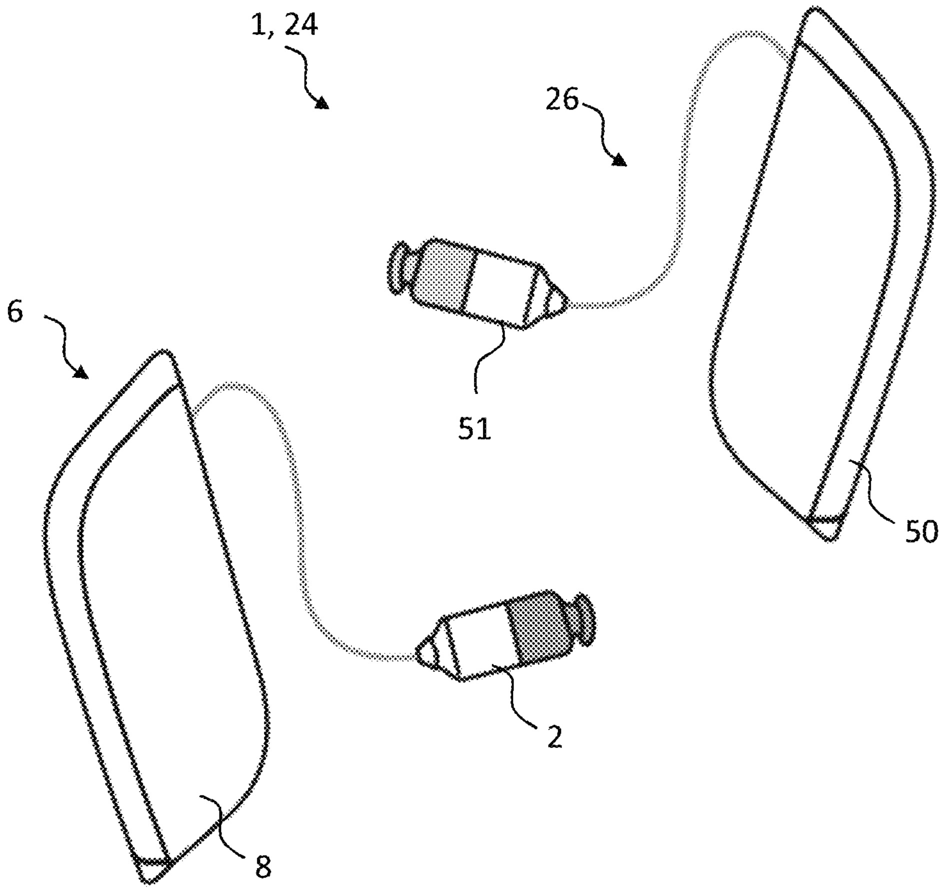

FIG. 3 schematically illustrates a set of hearing devices according to an embodiment of the present disclosure.

Figure 4:
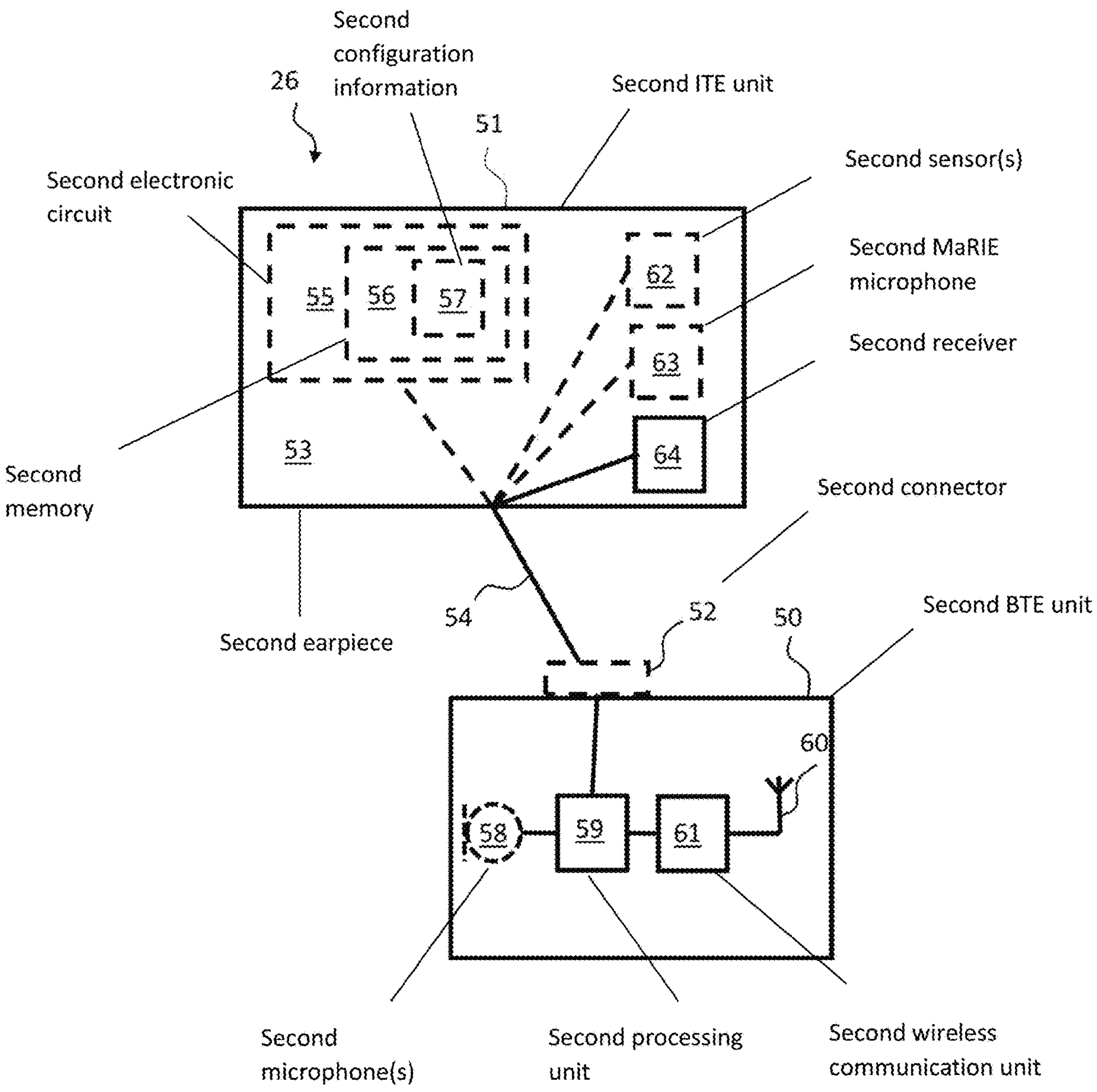

FIG. 4 schematically illustrates an exemplary embodiment of a second hearing device, according to an embodiment of the present disclosure.

Figure 5:
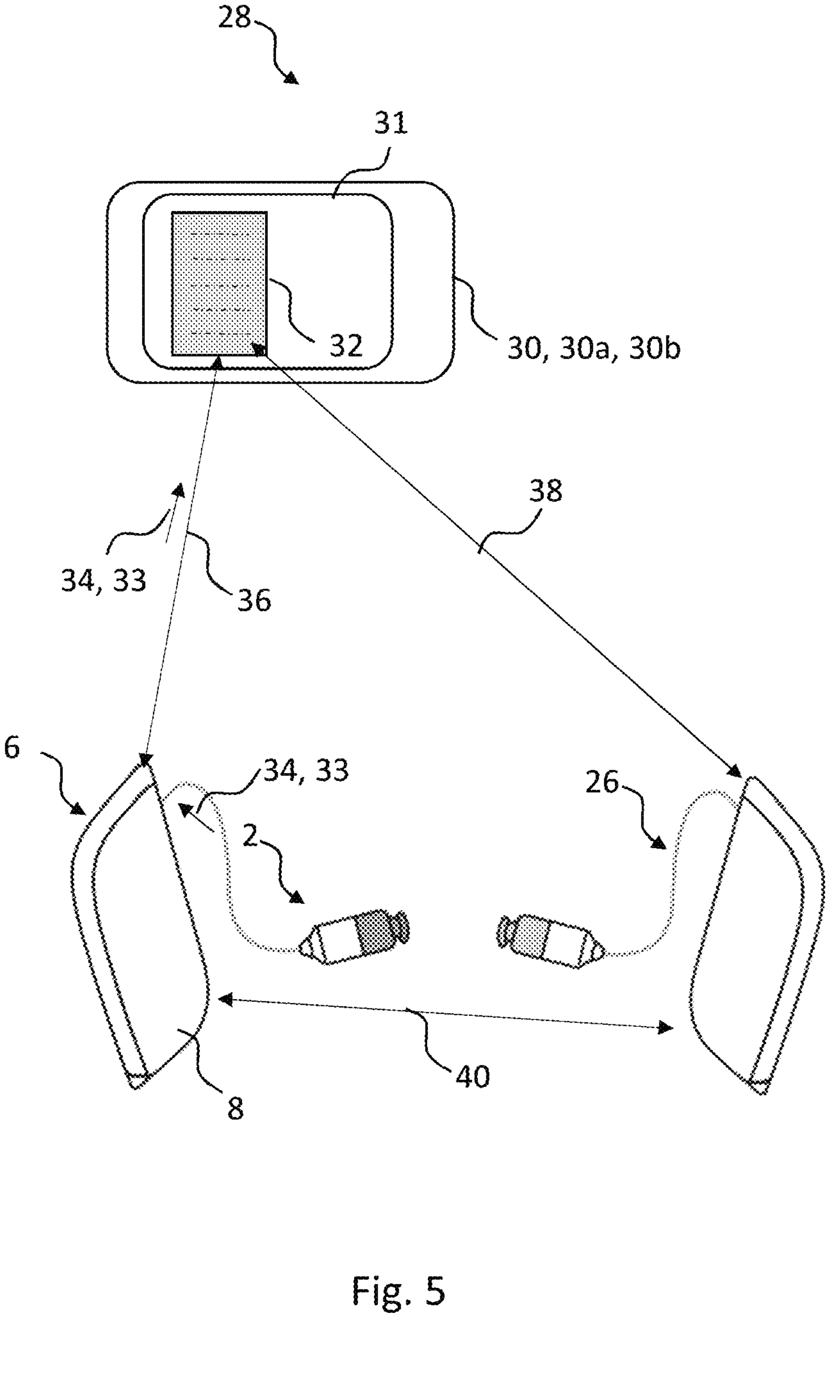

FIG. 5 schematically illustrates a hearing device fitting system according to an embodiment of the present disclosure.

Figure 6:
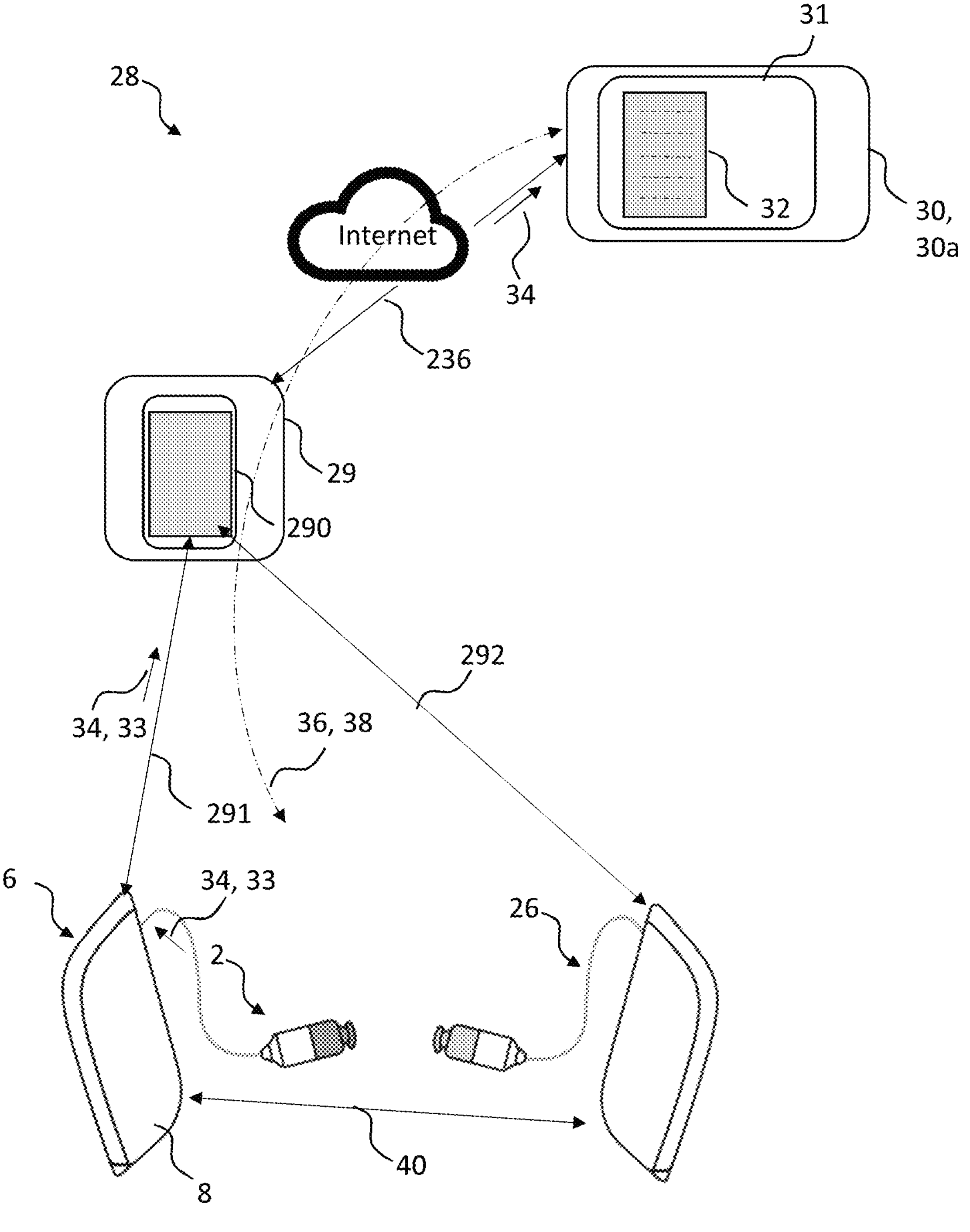

FIG. 6 schematically illustrates a hearing device fitting system according to another embodiment of the present disclosure.

Figure 7:
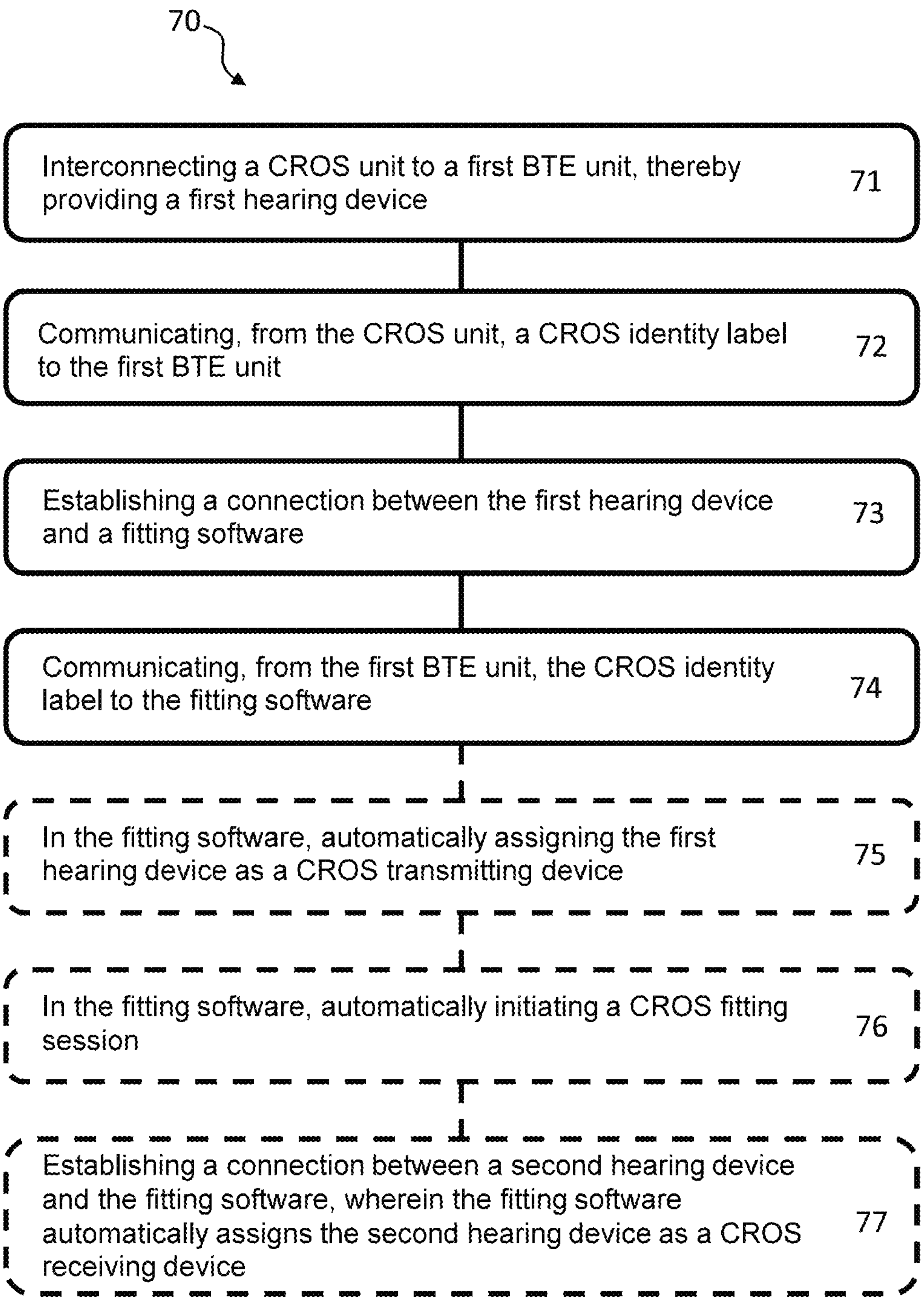

FIG. 7 schematically illustrates a method of initiating a fitting session of a CROS hearing device system according to an embodiment of the present disclosure.

Figure 8:
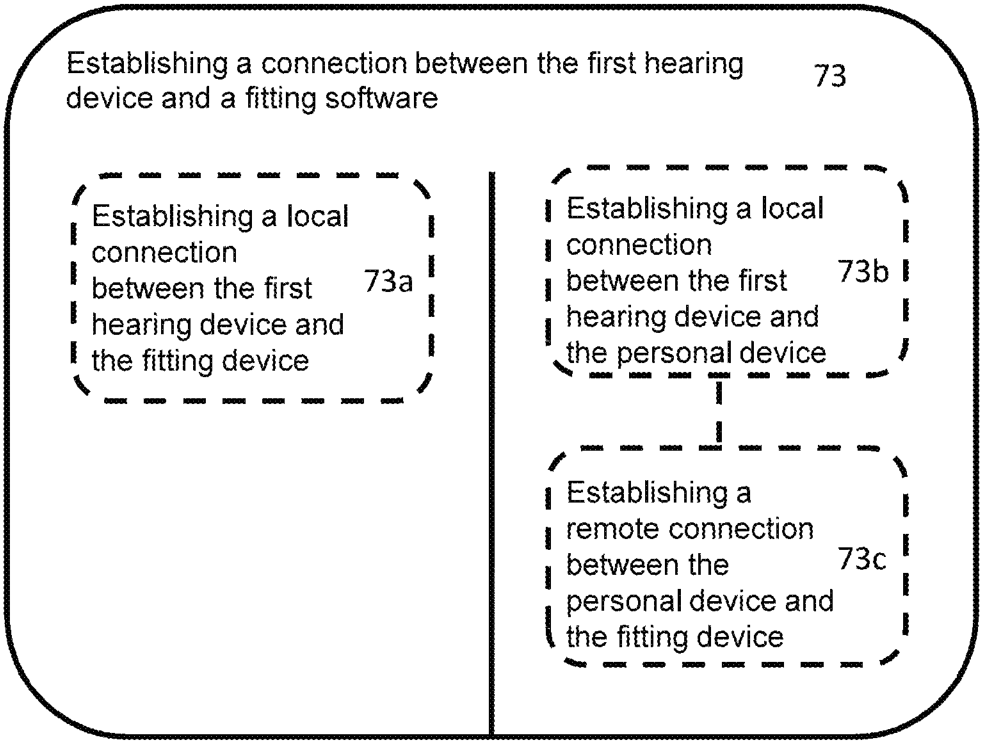

FIG. 8 schematically illustrates a step of establishing a connection between the first hearing device and the fitting software according to embodiments of the present disclosure.

DETAILED DESCRIPTION

Various embodiments are described hereinafter with reference to the accompanying drawings. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 a schematically illustrates an exemplary embodiment of a contralateral routing of signal (CROS) unit 2 according to an embodiment of the present disclosure. The CROS unit 2 for a contralateral routing of signal (CROS) hearing device system 1 (shown in FIG. 3) comprises a first electronic circuit 4. The CROS unit also comprises a CROS identity label 32, and the first electronic circuit 4 is configured to communicate the CROS identity label 32 to a first behind-the-ear (BTE) unit 8 (shown in FIG. 2*a*). The CROS unit 2 is configured to detachably connect to the first BTE unit. The CROS unit 2 may be considered as an in-the-ear (ITE) unit, such as a first ITE unit 2. The CROS identity label 32 may be stored at the first BTE unit 8.

FIG. 1*b* shows an exemplary embodiment of the CROS unit 2 in FIG. 1*a*.

FIG. 2*a* schematically illustrates an exemplary embodiment of a first contralateral routing of signal (CROS) hearing device 6, i.e. a first hearing device 6, according to an embodiment of the present disclosure. The first hearing device 6 comprises the CROS unit 2 and a first BTE unit 8. The CROS unit 2 is detachably connectable to the first BTE unit 8. The CROS unit 2 may comprise a first connector 10, a first earpiece 12, and a first electrical wire/tube 14 connecting the first earpiece 12 and the first BTE unit 8. The first connector 10 may comprise the first electronic circuit 4. Alternatively, and as shown in FIG. 2*a*, the first electronic circuit 4 may be arranged at or in the first earpiece 12. The first electronic circuit 4 may comprise a first memory 35 for storing the CROS identity label 32. The CROS identity label 32 may define a CROS power level, such as zero power or no power, wherein the CROS power level is indicative of the CROS unit either not comprising a first receiver or the CROS unit comprising a deactivated and/or non-working first receiver 43. The CROS identity label 32 may be part of one or more first configuration information 33 stored in the first memory 35 and/or the first electronic circuit 4. The first configuration information 33 may further comprise information of whether the CROS unit 2 is a right CROS unit or a left CROS unit, i.e. configured for being used in a left or right ear of the user, and/or whether the CROS unit 2 is a CROS RIE unit or a CROS MaRIE unit and/or identify the length of the first electrical wire/tube 14 of the CROS unit 2. The first BTE unit 8 comprises one or more first microphones 16 for reception of surrounding sounds, i.e. acoustic signals, and conversion of the received sound into a corresponding primary first electric input signal. The first BTE unit 8 further comprises a first processing unit 18, a first antenna 20 and a first wireless communication unit 22, the first wireless communication unit 22 being configured for wireless communication. FIG. 2*a*, as well as other figures are presented for illustrative purpose and the arrangement of the components presented can vary. The first earpiece 12 may further comprise one or more first sensors 41, a first MaRIE microphone 42 and/or a first receiver 43. The MaRIE microphone 42 may be configured to and/or arranged to receive surrounding sounds, i.e. acoustic signals from the environment of the user. The one or more first sensors 41 may be a temperature sensor and/or blood pressure sensor and/or fall detection sensor and/or snore detection sensor and/or movement detection sensor and/or acceleration sensor and/or positioning sensor, such as a gyroscope, etc. All information and/or signals obtained by the first sensors and/or the first MaRIE microphone, such as first sensor information and a primary MaRIE electric input signal, may be communicated to the first BTE unit 8, such as to the first processing unit 18 of the first BTE unit 8. The CROS identity label 32 and/or first configuration information 33 and/or first sensor information and/or the primary MaRIE electric input signal may be communicated to the first BTE unit 8 via the first connector and/or the first electrical wire/tube 14. Communication of the CROS identity label 32 and/or first configuration information 33 and/or first sensor information and/or the primary MaRIE electric input signal may include transmitting and receiving the CROS identity label 32 and/or first configuration information 33 and/or first sensor information and/or the primary MaRIE electric input signal. Alternatively, communication of the CROS identity label 32 and/or first configuration information 33 and/or first sensor information may include giving and obtaining access to read the CROS identity label 32 and/or first configuration information 33 and/or first sensor information being stored in the first electronic circuit 4 and/or first memory 35. Once the CROS identity label 32 and/or first configuration information 33 and/or first sensor information are received at the BTE unit 8, the BTE unit 8 may store the CROS identity label 32 and/or first configuration information 33 and/or first sensor information.

FIG. 2*b* shows an exemplary embodiment of the first CROS hearing device 6, i.e. the first hearing device 6, in FIG. 2*a*. Shown is an example of a first BTE unit 8 of a first hearing device 6 comprising a first behind-the-ear (BTE) housing 9. If the first BTE unit 8 is provided with two first microphones 16 (shown in FIG. 2*a*), the first BTE housing 9 may be provided with two first microphone openings 16*a*. There may be arranged one first microphone 16 at or near each first microphone opening 16*a*. The microphone openings 16*a* may be spaced apart to provide improved spatial acoustic output signals to the user. Further is shown an example of a CROS unit 2 of the first hearing device 6 being detachably connected with the first BTE unit 8 via the first connector 10. The CROS unit 2 comprises the first connector 10, a first earpiece 12 and a first electrical wire/tube 14 connecting the first connector 10 with the first earpiece 12. The first earpiece 12 may comprise a first receiver module 15 and a first earmold 13. The first earmold 13 may be a standard earmold or a custom earmold, wherein a custom earmold is shaped after the user's ear canal. Alternatively, the first earpiece 12 may comprise a first earpiece housing shaped after the ear canal of the user (not shown). The first connector 10 and/or the first receiver module 15 and/or the first earpiece housing may comprise the first electronic circuit 4 (shown in FIG. 2*a*). The first receiver module 15 or the first earpiece housing may or may not comprise a first receiver configured to act as a nonfunctional receiver (a dummy receiver). If the first connector 10 comprises the first electronic circuit 4, the main functionality of the first earpiece 12 may be to keep the first hearing device 6 correctly positioned on/at/in the ear of the user.

FIG. 3 schematically illustrates a contralateral routing of signal (CROS) hearing device system 1 comprising a set of hearing devices 24 for a user comprising a first hearing device 6 and a second hearing device 26. The first hearing device 6 comprises the CROS unit 2 connected to a first BTE unit 8, wherein the first hearing device 6 is a CROS transmitting device configured to be worn at a first ear of the user and wherein the second hearing device 26 is a CROS receiving device configured to be worn at the second ear of the user. The CROS transmitting device 6, i.e. the first BTE unit 8, is configured to transmit acoustic signals obtained and/or received by the one or more first microphones 16 and/or the first MaRIE microphone 42 (shown in FIG. 2*a*) at the user's first ear to the user's second ear provided with a second hearing device 26. The second hearing device 26 comprises a second behind-the-ear (BTE) unit 50 and a second in-the-ear (ITE) unit 51. The second BTE unit 50 may be similar to the first BTE unit 8. The first and second hearing devices being comprised of detectable connectable units as described above is an advantage as the Hearing Care Professional (HCP) would not need to have dedicated CROS hearing devices in stock, but only the standard hearing device BTE units, standard hearing device ITE units and the new CROS units to accommodate the needs of CROS hearing system users. Wherein the CROS units is a smaller and cheaper part than a dedicated CROS hearing device.

FIG. 4 schematically illustrates an exemplary embodiment of a second hearing device 26, according to an embodiment of the present disclosure. The second hearing device 26 is a CROS receiving device. The second hearing device 26 comprises a second behind-the-ear (BTE) unit 50 and a second in-the-ear (ITE) unit 51. The second ITE unit 51 may be detachably connectable to the second BTE unit 50. The second ITE unit 51 comprises a second earpiece 53, wherein the second earpiece 53 comprises a second receiver 64. The second ITE unit 51 further comprises a second connector 52 and a second electrical wire/tube 54 connecting the second earpiece 53 and the second BTE unit 50. The second connector 52 may be configured to provide mechanical and electrical connection between the second ITE unit 51 and the second BTE unit 50. The second connector 52 may comprise a second electronic circuit 55. Alternatively, and as shown in FIG. 4, the second electronic circuit 55 may be arranged at or in the second earpiece 53. The second electronic circuit 55 may comprise a second memory 56 for storing second configuration information 57. The second configuration information may comprise physical properties, electrical properties and/or electroacoustic properties of the second ITE unit. The second configuration information 57 may comprise information of whether the second ITE unit 51 is a right ITE unit or a left ITE unit, i.e. configured for being used in a left or right ear of the user, and/or whether the second ITE unit 51 is a RIE unit or a MaRIE unit and/or identify the length of the second electrical wire/tube 54 of the second ITE unit 51 and/or identify the power level of the second receiver 64, such as whether the second earpiece 53 comprises a low power receiver, a medium power receiver or a high power receiver. The second BTE unit 50 comprises a second processing unit 59, a second antenna 60 and a second wireless communication unit 61, the second wireless communication unit 61 being configured for wireless communication. The second BTE unit 50 may further comprise one or more second microphones 58 for reception of surrounding sound, i.e. acoustic signals, and conversion of the received sound into corresponding secondary first electric input signals. The second processing unit 59 may be configured for compensating a hearing loss of a hearing device user. FIG. 4, as well as other figures are presented for illustrative purpose and the arrangement of the components presented can vary. The second earpiece 53 may further comprise one or more second sensors 62 and/or a second MaRIE microphone 63. The one or more second sensors 62 may be a temperature sensor and/or blood pressure sensor and/or fall detection sensor and/or snore detection sensor and/or movement detection sensor and/or acceleration sensor and/or positioning sensor, such as a gyroscope, etc. All information and/or signals obtained by the second sensors and/or the second MaRIE microphone, such as second sensor information and a secondary MaRIE electric input signal, may be communicated to the second BTE unit 50, such as to the second processing unit 59 of the second BTE unit 50. The second configuration information 57 and/or second sensor information and/or the secondary MaRIE electric input signal may be communicated to the second BTE unit 50 via the second connector 52 and/or the second electrical wire/tube 54. Communication of the second configuration information 57 and/or second sensor information and/or the secondary MaRIE electric input signal may include transmitting and receiving the second configuration information 57 and/or second sensor information and/or the secondary MaRIE electric input signal. Alternatively, communicate of the second configuration information 57 and/or second sensor information may include giving and obtaining access to read second configuration information 57 and/or second sensor information being stored in the second electronic circuit 55 and/or second memory 56.

Alternatively, the second hearing device, i.e. the receiving device, may have another form factor than the first hearing device, i.e. the transmitting device. The second hearing device may be a ITE hearing device or a BTE hearing device comprising at least a second antenna and a second wireless communication unit, the second wireless communication unit being configured for wireless communication.

FIG. 5 schematically illustrates a hearing device fitting system 28 according to an embodiment of the present disclosure. The hearing device fitting system 28 is configured for fitting a contralateral routing of signal (CROS) hearing device system 1, such as a first hearing device 6 and a second hearing device 26. The hearing device fitting system 28 comprises a fitting device 30. The fitting device 30 executes a fitting software 32. The first hearing device 6 comprises the first BTE unit 8 and the CROS unit 2 configured to detachably connect to the first BTE unit 8. The initiation of a fitting session of the CROS hearing device system 1 starts with interconnecting the CROS unit 2 to the first BTE unit 8. Hereby is provided a first hearing device 6. The CROS unit 2 then communicates the CROS identity label 34 to the first BTE unit 8 by either automatically transmitting the CROS identity label 34 to the first BTE unit 8 or transmitting the CROS identity label 34 to the first BTE unit 8 upon request from the first BTE unit 8 or automatically give the first BTE unit 8 access to read the CROS identity label 34 or give the first BTE unit 8 access to read the CROS identity label 34 upon request from the first BTE unit 8. Then, the fitting software 32 may be started in order to establish a connection/communication link 36 between the first hearing device 6 and the fitting software 32 via the fitting device 30. The connection/communication link 36 between the first hearing device 6 and the fitting device 30 may be a first local, e.g. Bluetooth, connection/communication link. Once the connection/communication link 36 is established, the first BTE unit 8 communicates the CROS identity label 34 to the fitting software 32, so that the fitting software 32 detects or receives or read the CROS identity label 34 automatically. Once the fitting software 32 receives the CROS identity label 34, the fitting software 32 may store the CROS identity label 34 for further use. The CROS hearing device system 1 comprises the second hearing device 26, and the fitting software 32 may also automatically ensure establishing a connection/communication link 38 between the second hearing device 26 and the fitting software 32 via the fitting device 30. The connection/communication link 38 between the second hearing device 6 and the fitting device 30 may be a second local, e.g. Bluetooth, connection/communication link. When the fitting software 32 detects or receives or reads the CROS identity label 34, the fitting software 32 starts a CROS fitting session and assigns the first hearing device 6 as a CROS transmitting device. In a next step the fitting software 32 may automatically assign the second hearing device 26 as a CROS receiving device. The two hearing devices 6 and 26 may also be paired together by/via the fitting software 30 thereby establishing a binaural connection 40. After the initiation of a fitting session of the first hearing device 6 and the second hearing device 26, the HCP may perform further steps in fitting of the first and/or second hearing devices 6 and 26. In some embodiments, the fitting software 32 may automatically assign the first hearing device 6 as a CROS transmitting device. The fitting software 32 may automatically initiate a CROS fitting session upon receipt of the CROS identity label 34. The fitting device 30 may comprise a display 31. A representation of the CROS identity label 34 may be outputted on the display. The representation of the CROS identity label 34 may be outputted on the display together with further configuration information of the first hearing device, such as first configuration information 33 of the CROS unit.

The fitting device 30 may either be a HCP fitting device 30*a* used by a Hearing Care Professional (HCP) or a personal fitting device 30*b* used by the user using the first hearing device and the second hearing device 6, 26. The fitting software 32 may thus be started by either the HCP or the hearing device user. The HCP may perform professional fitting by use of the HCP fitting device 30*a*. The hearing device user may perform self-fitting by use of the personal fitting device 30*b*. Self-fitting is e.g. applied to over-the-counter (OTC) hearing devices. The personal fitting device 30*b* may be the user's mobile phone, tablet, computer, etc. The personal fitting device 30*b* may execute a software application comprising the fitting software, i.e. an app for self-fitting of the first hearing device 6 and/or the second hearing device 26.

FIG. 6 schematically illustrates a hearing device fitting system 28 according to another embodiment of the present disclosure. In this embodiment, the hearing device fitting system 28 comprises a personal device 29, and a fitting device 30, wherein the fitting device 30 may be a HCP fitting device 30*a*. The HCP fitting device 30*a* may be the HCP's computer. The personal device 29 may be used by the user using the first hearing device and the second hearing device 6, 26. The personal device 29 may be the user's mobile phone, tablet, computer, etc. The personal device 29 executes a software application 290, i.e. an app for facilitating remote fitting of the first hearing device 6 and/or the second hearing device 26. The first hearing device 6 comprises the first BTE unit 8 and the CROS unit 2 configured to detachably connect to the first BTE unit 8. The initiation of a fitting session of the CROS hearing device system 1 starts with interconnecting the CROS unit 2 to the first BTE unit 8. Hereby is provided a first hearing device 6. The CROS unit 2 then communicates the CROS identity label 34 to the first BTE unit 8 by either automatically transmitting the CROS identity label 34 to the first BTE unit 8 or transmitting the CROS identity label 34 to the first BTE unit 8 upon request from the first BTE unit 8 or automatically give the first BTE unit 8 access to read the CROS identity label 34 or give the first BTE unit 8 access to read the CROS identity label 34 upon request from the first BTE unit 8. The personal device 29 establishes a first local connection/communication link 291 with the first hearing device 6. The personal device 29 also establishes a second local connection/communication link 292 with the second hearing device 26. The first and second local connections 291 and 292 may be Bluetooth connections. The first hearing device 6, or more precisely the first BTE unit 8 communicates the CROS identity label 34 to the personal device, i.e. to the software application/app 290. The CROS identity label 34 and/or first configuration information 33 and/or first sensor information may be communicated to the software application 290 from the first hearing device 6, in particular from the first BTE unit 8 via the first local connection 291. The CROS identity label 34 and/or first configuration information 33 and/or first sensor information may be communicated to the software application from the first hearing device upon connection between the first hearing device and the personal device. Alternatively, the software application 290 may request, also through the first local connection 291, the CROS identity label 34 and/or first configuration information and/or first sensor information from the first hearing device 6, or the software application 290 may gain access to the CROS identity label 34 and/or first configuration information and/or first sensor information through the first hearing device 6. The software application may store the CROS identity label 34 and/or first configuration information 33 and/or first sensor information for further use.

The personal device 29 can establish a remote connection/communication link 236 with the fitting device 30. The remote connection/communication link 236 may be established via Internet. The remote connection/communication link 236 may comprise a virtual fitting room wherethrough the HCP may gain access to the CROS identity label 34 and/or first configuration information 33 and/or first sensor information stored in the software application or the remote connection/communication link 236 may comprise a cloud database whereto the software application may transmit/upload and wherefrom the fitting software may retrieve/download the CROS identity label 34 and/or first configuration information 33 and/or first sensor information. The remote connection/communication link 236 may be established upon a request sent from the personal device 29 or upon a request sent from the fitting software 32 to the software application 290. In particular, the fitting software 32 may be started by a HCP in order to establish the remote connection 236 between the software application 290 running on the personal device 29 and the fitting software 32 via the HCP fitting device 30*a*. Once the software application 290 obtains the CROS identity label 34 and/or first configuration information, and the remote connection 236 is established, the software application 290 may further communicate, via the remote/Internet connection/communication link 236, the CROS identity label 34 and/or first configuration information to the fitting software 31 running on the HCP fitting device 30*a*. This may be done either via a real-time connection in the virtual fitting room or a non-real-time connection via the cloud database. Thereby, the CROS identity label 34 and/or first configuration information is communicated from the first hearing device 6 to the fitting software 31 via the personal device 29. The fitting software 32 may store the CROS identity label 34 and/or first configuration information 33 and/or first sensor information for further use. The personal device 29 and the first hearing device 6 may be locally connected irrespective of the remote connection 236 between the personal device 29 and the fitting device 30. According to this embodiment, the communication link 36, 38 between the first/second hearing device is established through the first/second local connection 291/292 and the remote connection 236 via the personal device 29.

Once the CROS identity label 34 and optionally also the first configuration information is received/detected/read at the fitting software 31, the fitting software 31 will automatically assign the first hearing device 6 as a transmitting device and the second hearing device 26 as a receiving device. The first and second hearing device 6 and 26 may also be paired together by/via the fitting software 30 thereby establishing a binaural connection 40. After the initiation of the fitting of the first hearing device 6 and the second hearing device 26, the HCP may perform further steps in fitting of the first and/or second hearing device 6 and 26. The HCP may then adjust fitting parameters in the fitting software 31 and the fitting software 31 may then communicate, via the remote/Internet connection/communication link 236, these fitting parameters to the personal device 29. This may be done either directly via the real-time connection in the virtual fitting room or the non-real-time connection via the cloud database where the new fitting parameters is transmitted/uploaded from the fitting software to the cloud database wherefrom the software application may retrieve/download the fitting parameters. The personal device 29 will then communicate the fitting parameters to the first hearing device 6 and the second hearing device 26 via the local, e.g. Bluetooth, connection 291, 292. Communicating the fitting parameters from the personal device to the first hearing device and/or the second hearing device may or may not require an accept from the user. This embodiment is in particular advantageous for fitting sessions performed remotely, i.e. online. The remote/online fitting is normally performed in scenarios when the hearing device user is not present at the HCP, who normally operates the fitting software.

FIG. 7 schematically illustrates a method 70 of initiating a fitting session of a hearing device fitting system according to an embodiment of the present disclosure. The method 70 comprises the steps of, interconnecting a contralateral routing of signal (CROS) unit to a first behind-the-ear (BTE) unit, thereby providing a first hearing device 71. Communicating, from the CROS unit, a CROS identity label to the first BTE unit 72. Establishing a connection between the first hearing device and a fitting software 73. Communicating, from the first BTE unit, the CROS identity label to the fitting software 74. The method may further comprise, in the fitting software, automatically assigning the first hearing device as a CROS transmitting device 75 and/or, in the fitting software, automatically initiating a CROS fitting session upon detection and/or receipt and/or reading of the CROS identity label 76 and/or establishing a connection between a second hearing device and the fitting software, wherein the fitting software automatically assigns the second hearing device as a CROS receiving device 77. The connection between the fitting software and one or both of the first and/or second hearing device may be a wired or wireless connection. The connection between the fitting software and one or both of the first and/or second hearing device may be established via the fitting device.

FIG. 8 schematically illustrates a step of establishing a connection between the first hearing device and the fitting software 73 according to embodiments of the present disclosure.

In one embodiment the step of establishing a connection between the first hearing device and the fitting software 73 includes establishing a first local connection between the first hearing device and the fitting device 73*a*. The fitting device may be a HCP fitting device or a personal fitting device. The HCP fitting device may be the HCP's computer. The personal fitting device may be used by the user using the first hearing device. The personal fitting device may be the user's mobile phone, tablet, computer, etc. In this embodiment, the first BTE unit may communicate the CROS identity label to the fitting device via the local connection. The first hearing device then receives, via the local connection, fitting parameters from the fitting device, i.e. the fitting software. This embodiment is in particular advantageous for fitting sessions performed locally, i.e. by means of self-fitting, normally performed if the user has acquired over-the-counter (OTC) hearing devices, or at the HCP's clinic, normally performed in scenarios when the hearing device user is present at the HCP, who normally operates the fitting software.

In another embodiment, the fitting device is a HCP fitting device and the hearing device fitting system further comprises a personal device. The personal device may be used by the user using the first hearing device. The personal device may be the user's mobile phone, tablet, computer, etc. The step of establishing a connection between the first hearing device and the fitting software 73 includes establishing a first local connection between the first hearing device and the personal device 73*b*, and establishing a remote connection between the personal device and the fitting device 73*c*. In this embodiment, the first BTE unit may communicate the CROS identity label to the personal device and the personal device may communicate the CROS identity label to the fitting software, such that the fitting software receives the CROS identity label from the first BTE unit via the personal device. The fitting software may additionally communicate the CROS identity label to the personal device, i.e. such that the personal device receives the CROS identity label from the fitting software. The first hearing device then receives, via the remote connection, fitting parameters from the fitting device, i.e. the fitting software. This embodiment is in particular advantageous for fitting sessions performed remotely, i.e. online. The remote/online fitting is normally performed in scenarios when the hearing device user is not present at the HCP, who normally operates the fitting software.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items

1. A contralateral routing of signal (CROS) unit (2) for a contralateral routing of signal (CROS) hearing device system (1), the CROS unit being configured to detachably connect to a first behind-the-ear (BTE) unit (7), wherein the CROS unit comprises a CROS identity label (32) and a first electronic circuit (4), and the first electronic circuit (4) is configured to communicate the CROS identity label (32) to the first BTE unit.
2. The CROS unit according to item 1, wherein the CROS identity label is stored on the first electronic circuit.
3. The CROS unit according to item 1 or 2, wherein the CROS identity label is hardcoded in the first electronic circuit.
4. The CROS unit according to any of the preceding items, wherein the first electronic circuit comprises a first memory for storing the CROS identity label.
5. The CROS unit according to any of the preceding items, wherein the CROS unit comprises a first receiver configured to act as a nonfunctional receiver (a dummy receiver).
6. A first hearing device (6) comprising a first BTE unit (8) and a CROS unit (2) according to any of items 1-5, the hearing device (6) comprising:
   one or more first microphone(s) (16) for reception of acoustic signals and conversion of the received acoustic signals into corresponding primary first electrical input signals;
   a first processing unit (18),
   a first antenna (20) and a first wireless communication unit (22), the first wireless communication unit being configured for wireless communication.
7. A first hearing device according to item 6, wherein the first BTE unit is configured to detect a CROS identity label of the CROS unit.
8. A first hearing device according to item 6 or 7, wherein the first BTE unit is configured to adjust its operation in accordance with the CROS identity label.
9. A first hearing device according to items 6 to 8, wherein the first hearing device is a CROS transmitting device and wherein the first BTE unit is configured to transmit an acoustic signal received at the user's first ear to a second hearing device provided at/or/in the user's second ear.
10. A set of hearing devices (24) for a user comprising a first hearing device (6) and a second hearing device (26), the first hearing device comprising a CROS unit (2) according to items 1-5 connected to a first BTE unit (7), wherein the first hearing device is a CROS transmitting device according to item 9 configured to be worn at a first ear of the user and wherein the second hearing device is a CROS receiving device configured to be worn at the second ear of the user.
11. A hearing device fitting system (28) configured for fitting a first hearing device (6) according to items 6-9 or a set of hearing devices according to item 10, the hearing device fitting system comprising a fitting device (30) executing a fitting software (32), wherein the fitting device and the first hearing device are configured to establish a communication link (36) for exchange of information, wherein the first hearing device is configured to communicate the CROS identity label (32) to the fitting software via the communication link.
12. The hearing device fitting system according to item 11, wherein the fitting device is a Hearing Care Professional (HCP) fitting device and the hearing device fitting system further comprises a personal device, the personal device being a part of the communication link between the first hearing device and the HCP fitting device, wherein the first hearing device is configured to communicate the CROS identity label to the personal device and the personal device being configured to communicate the CROS identity label to the fitting software.
13. The hearing device fitting system according to item 11 or 12, wherein the fitting device is a HCP fitting device and the hearing device fitting system further comprises a personal device, the personal device being a part of the communication link between the first hearing device and the HCP fitting device, wherein the fitting software is configured to communicate the CROS identity label to the personal device.
14. The hearing device fitting system according to item 11, wherein the fitting device is a personal fitting device and the first hearing device is configured to communicate the CROS identity label to the personal fitting device.
15. A method of initiating a fitting session of a hearing device fitting system (28) configured for fitting a first hearing device (6), the hearing device fitting system comprising a fitting software (32) being executed by a fitting device (30), the first hearing device comprising a first BTE unit (8) and a CROS unit (2) configured to detachably connect to the first BTE unit, the method comprising:
   interconnecting the CROS unit to the first BTE unit;
   communicating, from the CROS unit, a CROS identity label to the first BTE unit;
   establishing a connection between the first hearing device and the fitting software, wherein the fitting software receives the CROS identity label from the first BTE unit.
16. The method according to item 15, wherein the fitting device is a HCP fitting device and the hearing device fitting system further comprises a personal device and wherein establishing a connection between the first hearing device and the fitting software includes:
   establishing a first local connection between the first hearing device and the personal device, and
   establishing a remote connection between the personal device and the HCP fitting device, wherein the fitting software receives the CROS identity label from the first BTE unit via the personal device and/or wherein the personal device receives the CROS identity label from the fitting software.
17. The method according to item 15, wherein the fitting device is a personal fitting device or a HCP fitting device and wherein establishing a connection between the first hearing device and the fitting software includes:
   establishing a first local connection between the first hearing device and respectively the personal fitting device or the HCP fitting device, wherein the fitting software receives the CROS identity label from the first BTE unit.
18. The method according to items 15 or 17, wherein the fitting software is automatically assigning the first hearing device as a CROS transmitting device.
19. The method according to items 15-18, wherein the fitting software automatically initiates a CROS fitting session upon receipt of the CROS identity label.
20. The method according to items 15-19, wherein the fitting device comprises a display and/or the fitting software comprises a graphical user interface (GUI), and wherein a representation of the CROS identity label is outputted on the display and/or graphical user interface.

21. The method according to item 20, wherein the representation of the CROS identity label is outputted on the display together with further first configuration information of the first CROS unit.

22. The method according to items 15-21, wherein the hearing device fitting system further is configured for fitting a second hearing device, the method further comprises: establishing a connection between the second hearing device and the fitting software, wherein the fitting software automatically assigns the second hearing device as a CROS receiving device.

23. The method according to items 15-22, wherein the fitting device comprises a processor configured for mapping the CROS identity label received from the first hearing device.

24. The method according to items 15-23, wherein the first hearing device is a hearing device according to items 6-9 and/or the hearing device fitting system is a hearing device fitting system according to items 11-14.

LIST OF REFERENCES

1 contralateral routing of signal (CROS) hearing device system
2 contralateral routing of signal (CROS) unit, first in-the-ear (ITE) unit
4 first electronic circuit
6 first hearing device, first contralateral routing of signal (CROS) hearing device
8 first behind-the ear (BTE) unit
9 first behind-the-ear (BTE) housing
10 first connector
12 first earpiece
13 first earmold
14 first electrical wire/tube
15 first receiver module
16 first microphone(s)
16*a* first microphone opening(s)
18 first processing unit
20 first antenna
22 first wireless communication unit
24 set of hearing devices
26 second hearing device, second contralateral routing of signal (CROS) hearing device,
28 hearing device fitting system
29 personal device
30 fitting device
30*a* HCP fitting device
30*b* personal fitting device
31 display
32 fitting software
33 first configuration information
34 CROS identity label
35 first memory
36 connection/communication link between first hearing device and fitting software
38 connection/communication link between second hearing device and fitting software
40 binaural connection
41 first sensor(s)
42 first MaRIE microphone
43 first receiver
50 second behind-the-ear (BTE) unit
51 second in-the-ear (ITE) unit
52 second connector
53 second earpiece
54 second electrical wire/tube
55 second electronic circuit
56 second memory
57 second configuration information
58 second microphone(s)
59 second processing unit
60 second antenna
61 second wireless communication unit
62 second sensor(s)
63 second MaRIE microphone
64 second receiver
70 method of initiating a fitting session of a contralateral routing of signal (CROS) hearing device system comprising steps 71 to 77.
236 remote connection/communication link between the personal device and fitting software
290 software application
291 first local connection/communication link between first hearing device and personal device
292 second local connection/communication link between second hearing device and personal device

The invention claimed is:

1. A contralateral-routing-of-signal (CROS) unit, comprising:
an electronic circuit; and
a CROS identity label;
wherein the CROS unit is configured to couple to a behind-the-ear (BTE) unit; and
wherein the electronic circuit of the CROS unit is configured to communicate the CROS identity label to the BTE unit; and
wherein the CROS unit is a part of a hearing device comprising the behind-the-ear (BTE) unit, and wherein the CROS unit is outside the BTE unit.

2. The CROS unit according to claim 1, wherein the CROS identity label is hardcoded in the electronic circuit.

3. The CROS unit according to claim 1, wherein the electronic circuit comprises a memory for storing the CROS identity label.

4. A device comprising:
the CROS unit of claim 1;
one or more microphone(s) for reception of acoustic signals and conversion of the received acoustic signals into corresponding electric input signals;
a processing unit;
an antenna; and
a wireless communication unit, the wireless communication unit being configured for wireless communication;
wherein the device is the hearing device.

5. The hearing device according to claim 4, wherein the BTE unit is configured to receive the CROS identity label from the CROS unit.

6. The device according to claim 4, wherein the BTE unit is configured to adjust its operation in accordance with the CROS identity label.

7. The CROS unit of claim 1, wherein the CROS unit is configured for placement outside a skin of a user.

8. A hearing device fitting system configured for fitting a hearing device, the hearing device comprising a contralateral-routing-of-signal (CROS) unit configured to couple to a behind-the-ear (BTE) unit, one or more microphone(s) for reception of acoustic signals and conversion of the received acoustic signals into corresponding electric input signals, a processing unit, an antenna, and a wireless communication unit configured for wireless communication, wherein the CROS unit comprises a CROS identity label, and an electronic circuit configured to communicate the CROS identity label to the BTE unit, the hearing device fitting system comprising:

a fitting device configured to execute a fitting software;

wherein the fitting device and the hearing device are configured to establish a communication link, and wherein the hearing device is configured to communicate the CROS identity label to the fitting device via the communication link.

9. The hearing device fitting system according to claim 8, wherein the fitting device is a Hearing Care Professional (HCP) fitting device, wherein the hearing device fitting system further comprises a personal device, the personal device being a part of the communication link between the hearing device and the HCP fitting device.

10. The hearing device fitting system according to claim 9, wherein the hearing device is configured to communicate the CROS identity label to the personal device, and wherein the personal device is configured to communicate the CROS identity label to the fitting software.

11. The hearing device fitting system according to claim 9, wherein the fitting device is configured to communicate the CROS identity label to the personal device.

12. The hearing device fitting system according to claim 8, wherein the fitting device is a personal fitting device, and wherein the hearing device is configured to communicate the CROS identity label to the personal fitting device.

13. A contralateral-routing-of-signal (CROS) unit, comprising:

an electronic circuit; and a CROS identity label;

wherein the CROS unit is configured to couple to a behind-the-ear (BTE) unit; and wherein the electronic circuit of the CROS unit is configured to communicate the CROS identity label to the BTE unit;

wherein the CROS unit is configured to detachably connect to the BTE unit.

14. A method involving a hearing device and a fitting device that configured to fit the hearing device, the fitting device configured to execute a fitting software, the hearing device comprising a BTE unit and a CROS unit configured to communicate a CROS identity label to the BTE unit, the method comprising:

establishing a connection between the hearing device and the fitting device; and receiving, by the fitting device, the CROS identity label from the BTE unit of the hearing device.

15. The method according to claim 14, wherein the fitting device is a Hearing Care Professional (HCP) fitting device, and wherein the connection between the hearing device and the fitting device is established by:

establishing a first local connection between the hearing device and a personal device; and establishing a remote connection between the personal device and the HCP fitting device;

wherein the CROS identity label from the BTE unit is received by the fitting device via the personal device, and/or wherein the CROS identity label from the fitting device is transmitted to the personal device.

16. The method according to claim 14, wherein the fitting device is a personal fitting device or a Hearing Care Professional (HCP) fitting device.

17. The method according to claim 14, further comprising assigning, by the fitting device, the hearing device as a CROS transmitting device.

18. The method according to claim 14, further comprising initiating, by the fitting device, a CROS fitting session upon receipt of the CROS identity label.

19. The method according to claim 14, wherein the fitting device comprises a display, and wherein the method further comprises outputting a representation of the CROS identity label for presentation on the display.

20. The method according to claim 19, wherein the representation of the CROS identity label is outputted for presentation on the display together with configuration information of the CROS unit.

21. The method according to claim 14, wherein the fitting device is configured to fit another hearing device, the method further comprising:

establishing a connection between the other hearing device and the fitting software; and assigning the other hearing device as a CROS receiving device.

22. The method according to claim 14, further comprising mapping, by the fitting device, the CROS identity label received from the BTE unit of the hearing device.

* * * * *